(12) United States Patent
Matsumoto et al.

(10) Patent No.: US 12,296,675 B2
(45) Date of Patent: May 13, 2025

(54) CONTROL DEVICE AND CONTROL PROGRAM PRODUCT

(71) Applicant: DENSO CORPORATION, Kariya (JP)

(72) Inventors: Yuuta Matsumoto, Kariya (JP); Kunihiko Chiba, Kariya (JP); Kazuki Kojima, Kariya (JP); Shiori Maneyama, Kariya (JP); Yukari Itou, Kariya (JP)

(73) Assignee: DENSO CORPORATION, Kariya (JP)

( * ) Notice: Subject to any disclaimer, the term of this patent is extended or adjusted under 35 U.S.C. 154(b) by 111 days.

(21) Appl. No.: 17/963,677

(22) Filed: Oct. 11, 2022

(65) Prior Publication Data

US 2023/0030288 A1    Feb. 2, 2023

Related U.S. Application Data

(63) Continuation of application No. PCT/JP2021/010173, filed on Mar. 12, 2021.

(30) Foreign Application Priority Data

Apr. 16, 2020 (JP) .................................. 2020-073643
Mar. 1, 2021 (JP) .................................. 2021-031852

(51) Int. Cl.
*B60K 35/00* (2024.01)
*B60K 35/29* (2024.01)
(Continued)

(52) U.S. Cl.
CPC ........... *B60K 35/00* (2013.01); *B60W 30/146* (2013.01); *B60W 40/04* (2013.01); *B60W 40/08* (2013.01);
(Continued)

(58) Field of Classification Search
CPC ........ B60K 35/00; B60K 35/29; B60K 35/81; B60K 2360/1868; B60K 2360/195;
(Continued)

(56) References Cited

U.S. PATENT DOCUMENTS 9,381,916 B1 *   7/2016   Zhu .................... B60W 30/0956
10,565,873 B1 *  2/2020   Christensen ............ H04W 4/40
(Continued)

FOREIGN PATENT DOCUMENTS

EP       3330825 A1 *  6/2018  ............ B60W 30/00
JP    2008306329 A     12/2008
(Continued)

*Primary Examiner* — Michael J Zanelli
(74) *Attorney, Agent, or Firm* — Harness, Dickey & Pierce, P.L.C.

(57) ABSTRACT

A control device is used in a subject vehicle capable of performing autonomous driving with no obligation for a driver to monitor periphery. The control device determines whether a permission state, in which a specific act other than driving is permitted to the driver, is continued or not when approach of an emergency vehicle to the subject vehicle is detected during an autonomous cruising period in which the autonomous driving is being performed. The control device restricts display of a content provided to the driver when the permission state of the specific act is determined to be not continued.

44 Claims, 24 Drawing Sheets

(51) Int. Cl.
*B60K 35/81* (2024.01)
*B60W 30/14* (2006.01)
*B60W 40/04* (2006.01)
*B60W 40/08* (2012.01)
*B60W 50/14* (2020.01)
*B60W 60/00* (2020.01)

(52) U.S. Cl.
CPC ........ *B60W 50/14* (2013.01); *B60W 60/0018* (2020.02); *B60K 35/29* (2024.01); *B60K 35/81* (2024.01); *B60K 2360/1868* (2024.01); *B60K 2360/195* (2024.01); *B60W 2040/0827* (2013.01); *B60W 2050/146* (2013.01); *B60W 60/0053* (2020.02); *B60W 2540/229* (2020.02); *B60W 2540/26* (2013.01); *B60W 2554/4046* (2020.02); *B60W 2554/406* (2020.02); *B60W 2554/80* (2020.02)

(58) Field of Classification Search
CPC .. B60W 30/0018; B60W 40/04; B60W 40/08; B60W 50/14; B60W 60/0018; B60W 60/0053; B60W 60/0013; B60W 60/005; B60W 60/0051; B60W 2040/0827; B60W 2050/146; B60W 2540/229; B60W 2540/26; B60W 2554/4046; B60W 2554/406; B60W 2554/80
See application file for complete search history.

(56) References Cited

U.S. PATENT DOCUMENTS

| | | |
|---|---|---|
| 2018/0075750 A1 | 3/2018 | Takamura et al. |
| 2018/0208211 A1 | 7/2018 | Chiba |
| 2018/0233047 A1* | 8/2018 | Mandeville-Clarke ................. B60W 30/00 |
| 2018/0329414 A1 | 11/2018 | Igarashi et al. |
| 2019/0378413 A1 | 12/2019 | Takamura et al. |
| 2020/0339147 A1* | 10/2020 | Hayakawa ............ B60K 35/00 |

FOREIGN PATENT DOCUMENTS

| | | |
|---|---|---|
| JP | 2017024521 A | 2/2017 |
| JP | 2017102664 A | 6/2017 |
| JP | 2017107502 A | 6/2017 |
| JP | 2018041383 A | 3/2018 |
| JP | 2020-009285 A | 1/2020 |
| WO | WO-2017085981 A1 | 5/2017 |

\* cited by examiner

CONTROL DEVICE AND CONTROL PROGRAM PRODUCT

CROSS REFERENCE TO RELATED APPLICATIONS

The present application is a continuation application of International Patent Application No. PCT/JP2021/010173 filed on Mar. 12, 2021, which designated the U.S. and claims the benefit of priority from Japanese Patent Application No. 2020-073643 filed on Apr. 16, 2020 and Japanese Patent Application No. 2021-031852 filed on Mar. 1, 2021. The entire disclosures of all of the above applications are incorporated herein by reference.

TECHNICAL FIELD

The present disclosure relates to a control device and a control program product used in a vehicle capable of autonomous cruising.

BACKGROUND

There has been known a technology which enables a driver to be in a state of a second task, such as operating a smartphone or watching a television broadcast, during autonomous cruising executed by an autonomous driving ECU.

SUMMARY

The present disclosure provides a control device, which is used in a subject vehicle capable of performing autonomous driving with no obligation for a driver to monitor periphery, is provided.

According to an aspect, the control device determines whether a permission state, in which a specific act other than driving is permitted to the driver, is continued or not when approach of an emergency vehicle to the subject vehicle is detected during an autonomous cruising period in which the autonomous driving is being performed. The control device restricts display of a content provided to the driver when the permission state of the specific act is determined to be not continued.

According to another aspect, the control device determines whether an emergency vehicle is approaching the subject vehicle during an autonomous cruising period in which the autonomous driving is being performed. The control device further determines whether to continue the autonomous driving and whether to continue a permission state in which a specific act other than driving is permitted to the driver, when determining that the emergency vehicle is approaching the subject vehicle.

BRIEF DESCRIPTION OF DRAWINGS

Objects, features and advantages of the present disclosure will become apparent from the following detailed description made with reference to the accompanying drawings.

DETAILED DESCRIPTION

Figure 1:
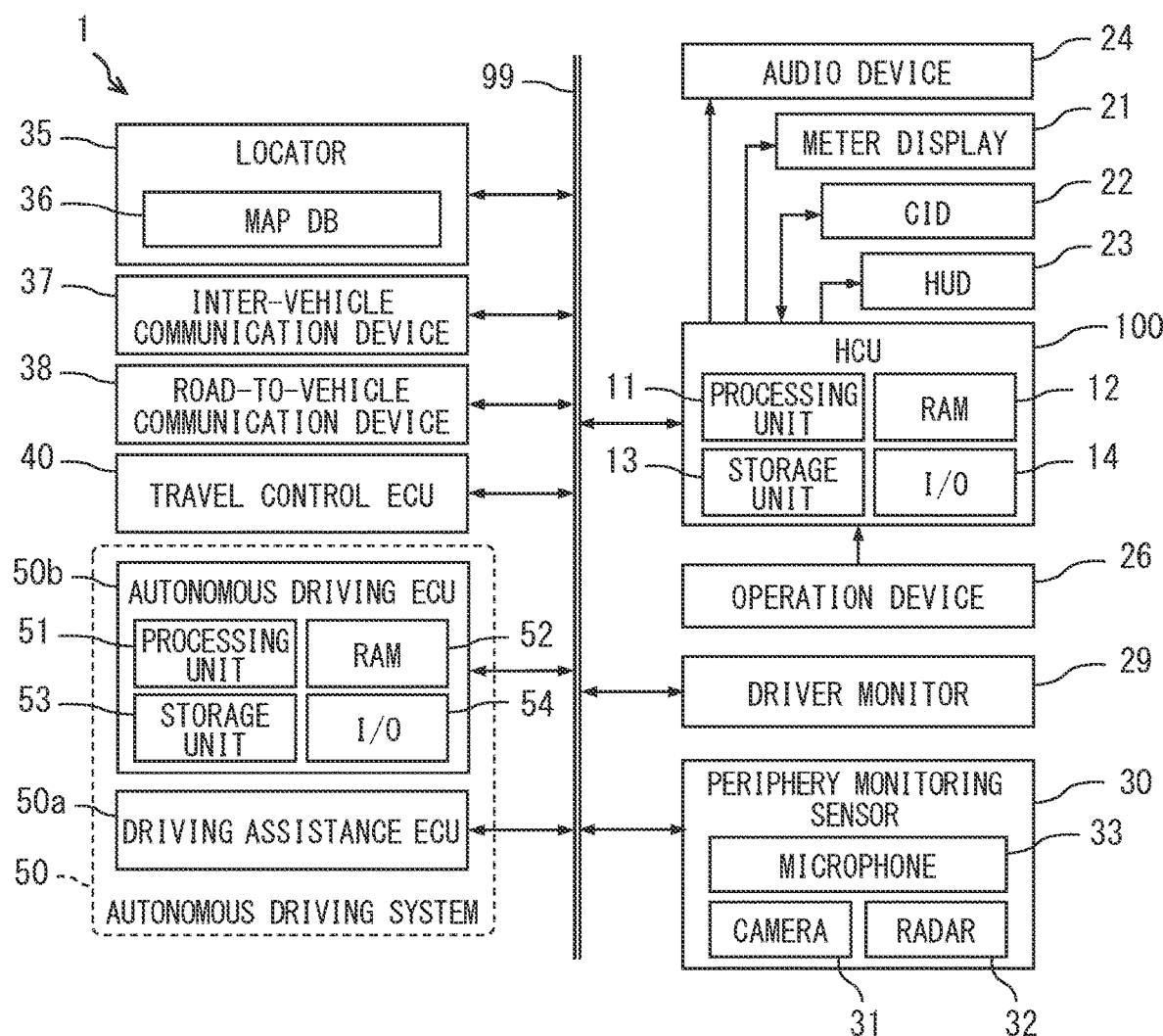
FIG. 1 is a view illustrating an overall image of an in-vehicle network according to a first embodiment of the present disclosure.

According to an aspect of the present disclosure, a control device, which is used in a subject vehicle capable of performing autonomous driving with no obligation for a driver to monitor periphery, is provided. The control device includes: a continuation determination unit that determines whether a permission state, in which a specific act other than driving is permitted to the driver, is continued or not when approach of an emergency vehicle to the subject vehicle is detected during an autonomous cruising period in which the autonomous driving is being performed; and a provision restriction unit that restricts display of a content provided to the driver when the continuation determination unit determines that the permission state of the specific act is not continued.

According to another aspect of the present disclosure, a control program product stored in a computer-readable non-transitory storage medium is provided. The control program product includes instructions to be executed by a processing unit of a subject vehicle, which is capable of performing autonomous driving with no obligation for a driver to monitor periphery. The instructions includes: when approach of an emergency vehicle to the subject vehicle is detected during an autonomous cruising period in which the autonomous driving is performed, determining whether a permission state, in which a specific act other than driving is permitted to the driver, is continued; and when determining that the permission state of the specific act is not continued, restricting display of a content provided to the driver.

In the above configuration, while the driver is performing the specific act other than driving during the autonomous cruising period with no obligation to monitor the periphery, and when it is determined that the permission state of the specific act is not continued due to the approach of emergency vehicle to the subject vehicle, display of content to be provided is restricted. Therefore, even during the execution of the specific act, the driver can easily notice approach of the emergency vehicle by the restriction on the display of content. Thus, even if the emergency vehicle approaches during autonomous cruising, it is possible to make it difficult to cause anxiety to the driver.

According to another aspect of the present disclosure, a control device, which is used in a subject vehicle capable of performing autonomous driving with no obligation for a driver to monitor periphery, is provided. The control device includes: an approach determination unit that determines whether an emergency vehicle is approaching the subject vehicle during an autonomous cruising period in which the autonomous driving is being performed; and a continuation determination unit that determines whether to continue the autonomous driving and whether to continue a permission state in which a specific act other than driving is permitted to the driver, when the approach determination unit determines that the emergency vehicle is approaching the subject vehicle.

According to another aspect of the present disclosure, a control program product stored in a computer-readable non-transitory storage medium is provided. The control program product includes instructions to be executed by a processing unit of a subject vehicle, which is capable of performing autonomous driving with no obligation for a driver to monitor periphery. The instructions includes: determining whether an emergency vehicle is approaching the subject vehicle during an autonomous cruising period in which the autonomous driving is being performed; and when determining that the emergency vehicle is approaching the subject vehicle, further determining whether to continue the autonomous driving and whether to continue a permission state in which a specific act other than driving is permitted to the driver.

In the above configuration, while the driver is performing the specific act other than driving during the autonomous cruising period with no obligation to monitor the periphery, and when it is determined that the emergency vehicle is approaching the subject vehicle, it is determined whether to continue the autonomous driving and whether to continue the permission state of the specific act. Therefore, even during the execution of the specific act, the driver can easily notice the approach of the emergency vehicle because the autonomous driving or the permission state of the specific act is not continued. According to the above, even if the emergency vehicle approaches during autonomous cruising, it is possible to make it difficult to cause anxiety to the driver.

The following will describe embodiments of the present disclosure with reference to the accompanying drawings. In the following description, the same reference symbols are assigned to corresponding components in each embodiment in order to avoid repetitive descriptions. In each of the embodiments, when only a part of the configuration is described, the remaining parts of the configuration may adopt corresponding parts of other embodiments. In addition to the combinations of configurations specifically shown in various embodiments, the configurations of various embodiments can be partly combined even if not explicitly suggested, unless such combinations are contradictory. Combinations of the embodiments and modifications that are not explicitly described are also deemed to be disclosed by the present disclosure.

FIRST EMBODIMENT

The function of a control device according to a first embodiment of the present disclosure is realized by an autonomous driving electronic control unit (ECU) 50*b* and a human machine interface control unit (HCU) 100. Together with a driving assistance ECU 50*a* and the like, the autonomous driving ECU 50*b* illustrated in FIG. 1 configures an autonomous driving system 50 used in a vehicle Am. By mounting the autonomous driving system 50, the vehicle Am becomes an autonomous driving vehicle provided with an autonomous driving function.

Figure 2:
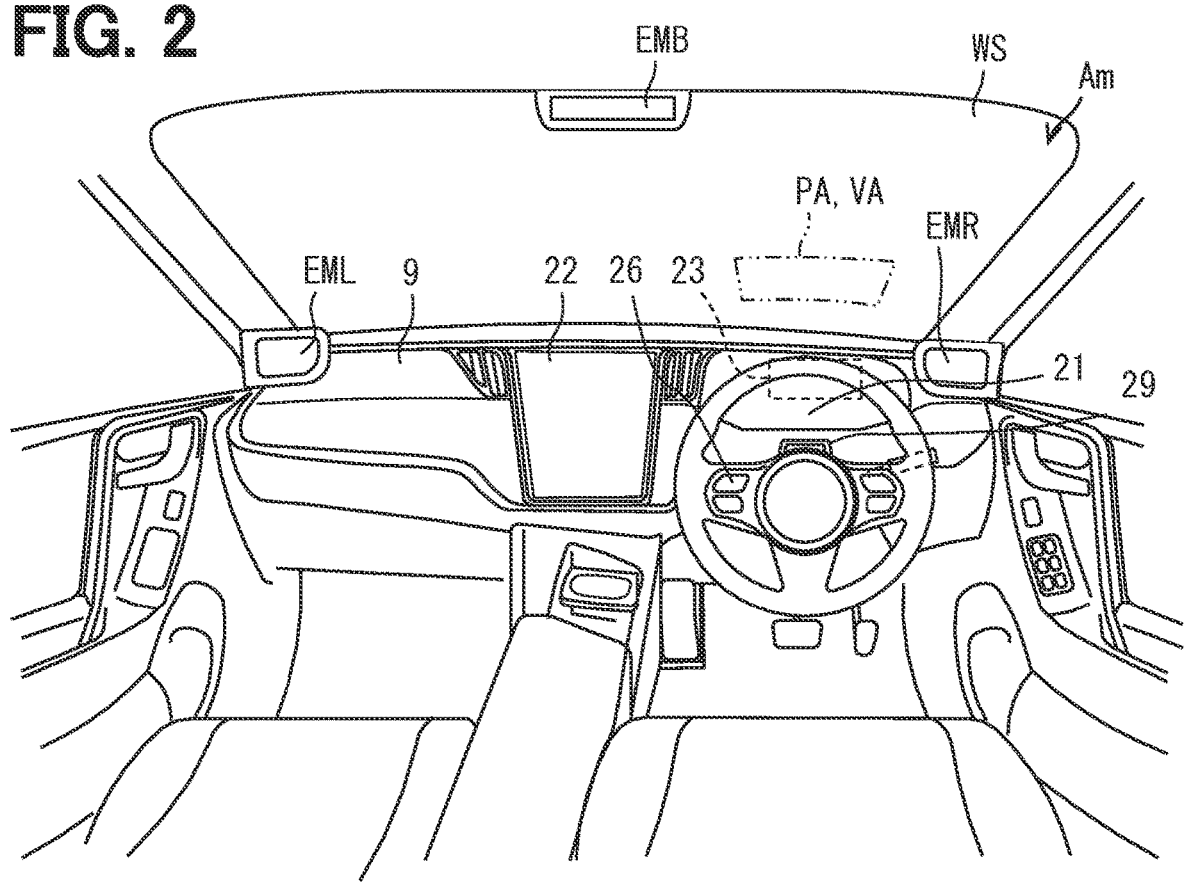
FIG. 2 is a view illustrating an example of a layout of interfaces around a driver's seat.
Figure 3:
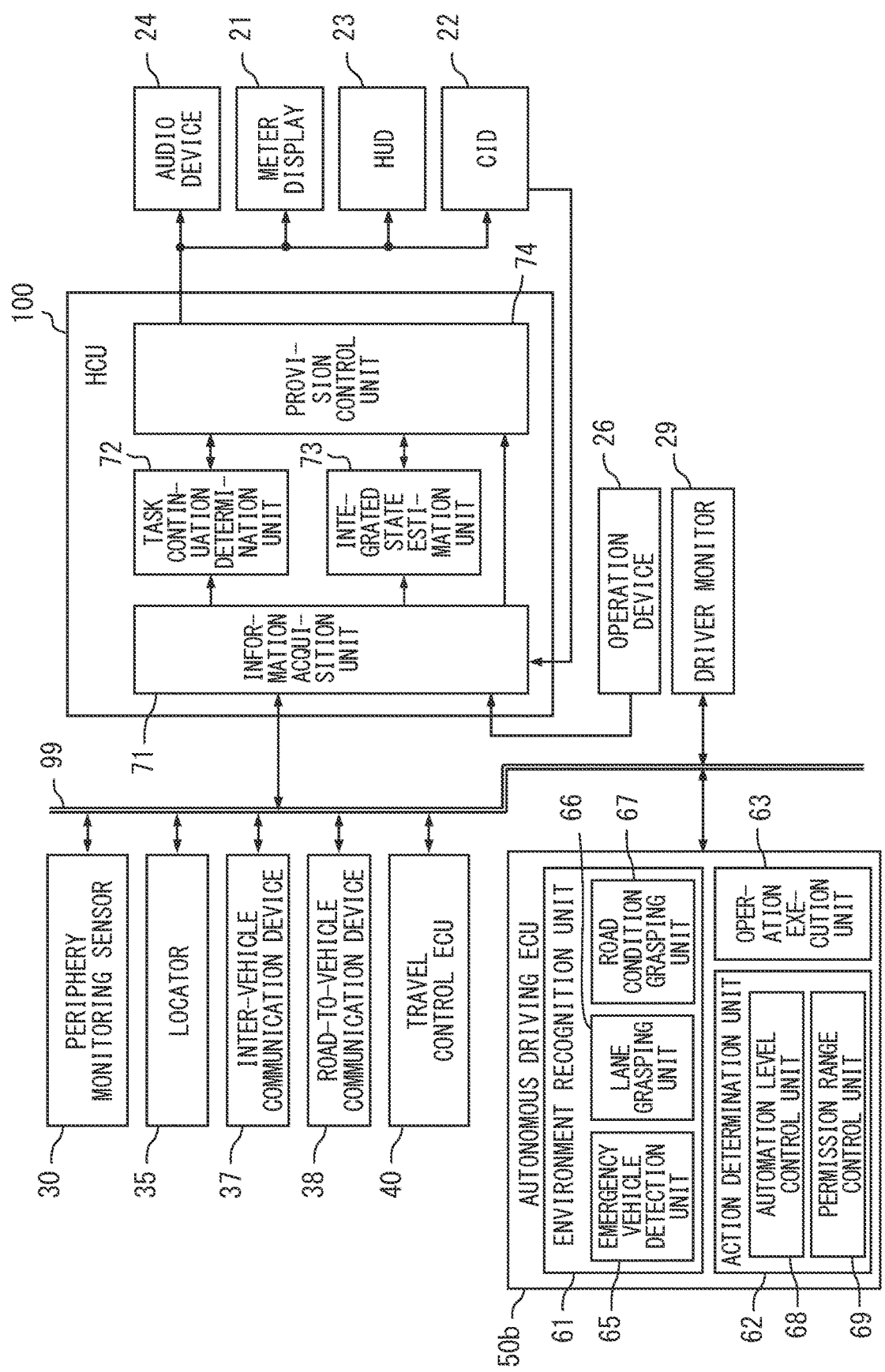
FIG. 3 is a view illustrating an example of functional units built in an autonomous driving ECU and an HCU as well as related configurations.

As illustrated in FIGS. 1 to 3, the HCU 100, together with a plurality of display devices, an audio device 24, an operation device 26, and the like, configures a human machine interface (HMI) system used in the vehicle Am. The HMI system has an input interface function of receiving an operation by an occupant (e.g., a driver) of the vehicle Am and an output interface function of presenting information to the driver.

The autonomous driving ECU 50*b* and the HCU 100 are communicably connected to a communication bus 99 of an in-vehicle network 1 mounted on the vehicle Am. The autonomous driving ECU 50*b* and the HCU 100 are each one of a plurality of nodes provided in the in-vehicle network 1. To the communication bus 99, a driver monitor 29, a periphery monitoring sensor 30, a locator 35, an inter-vehicle communication device 37, a road-to-vehicle communication device 38, a travel control ECU 40, the driving assistance ECU 50*a*, and the like are further connected. These nodes connected to the communication bus 99 of the in-vehicle network 1 can communicate with each other. Among these devices and ECUs, specific nodes may be directly and electrically connected to each other such that they can implement communication without passing through the communication bus 99.

The driver monitor 29 includes a near-infrared light source, a near-infrared camera, and a control unit that controls them. The driver monitor 29 is installed, for example, on the upper surface of a steering column portion or the upper surface of an instrument panel 9 in a posture in which the near-infrared camera faces a headrest portion of a driver's seat. The near-infrared camera may be integrated with a meter display 21 or a center information display (hereinafter, CID) 22 to be described later so as to be embedded in either screen.

The driver monitor 29 photographs, with the near-infrared camera, the head of a driver that is irradiated with near-infrared light by the near-infrared light source. An image captured by the near-infrared camera is subjected to image analysis by the control unit. The control unit extracts information, such as the position of the eye point and the line-of-sight direction of the driver, from the captured image, and provides the extracted information on the state of the driver to the HCU 100 and the like through the communication bus 99.

The periphery monitoring sensor 30 is an autonomous sensor that monitors the peripheral environment of the vehicle Am. The periphery monitoring sensor 30 can detect a moving object and a stationary object specified in advance from a detection range around a subject vehicle. The periphery monitoring sensor 30 can detect at least a front vehicle, a rear vehicle, a front or rear side vehicle, and the like traveling around the subject vehicle. The periphery monitoring sensor 30 provides detected information on an object around the vehicle to the driving assistance ECU 50a, the autonomous driving ECU 50b, and the like through the communication bus 99.

The periphery monitoring sensor 30 includes, for example, a camera unit 31, a millimeter-wave radar 32, and a microphone 33. The periphery monitoring sensor 30 may further include a detection configuration such as a lidar and a sonar.

The camera unit 31 includes a plurality of camera modules mounted on the vehicle Am so as to be capable of photographing a front range, a side range, a rear range, and the like of the vehicle Am. Each camera module may include a monocular camera, or may include a compound-eye camera. The camera unit 31 outputs, as the detected information, at least one of captured data obtained by photographing the periphery of the vehicle with the each camera module and an analysis result of the captured data.

The millimeter-wave radar 32 emits a millimeter wave or a quasi-millimeter wave toward the periphery of the subject vehicle. The millimeter-wave radar 32 outputs detected information generated by processing to receive a reflected wave reflected by the moving object, the stationary object, or the like.

The microphone 33 is a sound collector that collects environmental sound around the vehicle Am. When an emergency vehicle Qs (see FIG. 8, etc.) is approaching the vehicle Am, the microphone 33 collects environmental sound including specific siren sound sounded by the emergency vehicle Qs and a voice from a loudspeaker. The microphone 33 outputs, as the detected information, at least one of the environmental sound and information indicating that the siren sound is extracted from the environmental sound.

The locator 35 includes a global navigation satellite system (GNSS) receiver, an inertial sensor, and the like. The locator 35 combines a positioning signal received by the GNSS receiver, a measurement result of the inertial sensor, vehicle speed information output to the communication bus 99, and the like, in order to sequentially position the position, the traveling direction, and the like of the vehicle Am. The locator 35 sequentially outputs, as locator information, the position information and the direction information on the vehicle Am based on a positioning result to the communication bus 99.

The locator 35 further includes a map database 36. The map database 36 mainly includes a large-capacity storage medium storing a large number of pieces of three-dimensional map data and two-dimensional map data. The three-dimensional map data is so-called high-precision map data, and includes information necessary for advanced driving assistance and autonomous driving, such as three-dimensional shape information on a road and detailed information on each lane. The locator 35 reads map data around the current position from the map database 36, and provides, together with the locator information, the map data to the driving assistance ECU 50a, the autonomous driving ECU 50b, and the like.

The inter-vehicle communication device 37 mainly includes a communication module for wirelessly communicating with an in-vehicle device mounted on another vehicle. The inter-vehicle communication device 37 can directly or indirectly transmit and receive information to and from an in-vehicle device of another vehicle, and acquires information on the position, speed, and others of the another vehicle. When the emergency vehicle Qs (see FIG. 8, etc.) is approaching the vehicle Am, the inter-vehicle communication device 37 can receive information transmitted from the in-vehicle device of the emergency vehicle Qs, that is, the position and moving speed of the emergency vehicle Qs.

The road-to-vehicle communication device 38 mainly includes a communication module for receiving information distributed from a roadside device installed beside a road. The road-to-vehicle communication device 38 receives signal information, congestion information, regulatory information, and the like on a road near the roadside device by means such as FM multiplex broadcasting, a radio beacon, or an optical beacon. In addition, the road-to-vehicle communication device 38 can receive information on the approach of the emergency vehicle Qs (see FIG. 8, etc.) from the roadside device.

The travel control ECU 40 is an electronic control device mainly including a microcontroller. The travel control ECU 40 has at least functions of a brake control ECU, a drive control ECU, and a steering control ECU. The travel control ECU 40 continuously executes the braking force control of each wheel, the output control of an in-vehicle power source, and steering angle control on the basis of any one of an operation command based on a driving operation by the driver, a control command by the driving assistance ECU 50a, and a control command by the autonomous driving ECU 50b. In addition, the travel control ECU 40 generates vehicle speed information indicating the current traveling speed of the vehicle Am on the basis of a detection signal of a wheel speed sensor provided in the hub portion of each wheel, and sequentially outputs the vehicle speed information to the communication bus 99.

The driving assistance ECU 50a is an in-vehicle ECU that realizes a driving assistance function for assisting the driving operation by the driver. The driving assistance ECU 50a enables advanced driving assistance at about level 2 that requires periphery monitoring by a driver among the autonomous driving levels specified by the American Society of Automotive Engineers, or partial autonomous cruise control.

The driving assistance ECU 50a is a computer mainly including a control circuit including a processing unit, a RAM, a storage unit, an I/O interface, a bus connecting them, and the like. The driving assistance ECU 50a includes a plurality of functional units that realize advanced driving assistance by the processing unit executing a program. Specifically, the driving assistance ECU 50*a* includes an adaptive cruise control (ACC) functional unit, a lane tracking assist (LTA) functional unit, and a lane change assist (LCA) functional unit.

In contrast to the driving assistance ECU 50*a*, the autonomous driving ECU 50*b* is an in-vehicle ECU that realizes an autonomous driving function capable of replacing the driving operation by the driver. The autonomous driving ECU 50*b* enables level 3 or above autonomous traveling in which the system is a control subject only in a preset limited area (Operational Design Domain, ODD). The autonomous driving ECU 50*b* enables eyes-off autonomous driving that does not require visual monitoring of the periphery around the vehicle by the driver. Note that the autonomous driving ECU 50*b* may be capable of realizing a level 4 or above autonomous driving function.

The autonomous driving ECU 50*b* is a computer mainly including a control circuit including a processing unit 51, a RAM 52, a storage unit 53, an I/O interface 54, a bus connecting them, and the like. The autonomous driving ECU 50*b* has higher calculation capability than the driving assistance ECU 50*a*, and can execute at least travel control corresponding to ACC, LTA, and LCA.

The processing unit 51 is hardware for arithmetic processing that is coupled with the RAM 52. The processing unit 51 includes at least one arithmetic core such as a central processing unit (CPU) and a graphics processing unit (GPU). The processing unit 51 may further include a field-programmable gate array (FPGA), a neural network processing unit (NPU), an IP core provided with another dedicated function, and the like. The processing unit 51 executes various processing to realize the control method of the present disclosure by accessing the RAM 52. The storage unit 53 includes a non-volatile storage medium. The storage unit 53 stores various programs (autonomous driving control program, etc.) to be executed by the processing unit 51.

The autonomous driving ECU 50*b* includes an environment recognition unit 61, an action determination unit 62, and an operation execution unit 63 as a plurality of functional units that realize autonomous driving with no obligation for the driver to monitor the periphery by the processing unit 51 executing the programs (autonomous driving control program).

The environment recognition unit 61 recognizes the traveling environment of the vehicle Am on the basis of the locator information and map data acquired from the locator 35 and the detected information acquired from the periphery monitoring sensor 30. Specifically, the environment recognition unit 61 grasps the position of a subject vehicle lane Lns (see FIG. 8) on which the subject vehicle travels among a plurality of lanes, the lane shape of the subject vehicle lane Lns, and the relative position, relative speed, and others of another vehicle around the subject vehicle. Note that the position of the subject vehicle lane Lns may be identified by the locator 35. In addition, a recognition result of the traveling environment by the environment recognition unit 61 may be provided to the HCU 100 as recognition information.

The action determination unit 62 generates a scheduled traveling line on which the vehicle Am is allowed to travel on the basis of the recognition result of the traveling environment by the environment recognition unit 61. When a destination is set in a navigation mounted on the vehicle Am, the action determination unit 62 refers to route information generated by a navigation system, and sequentially generates the scheduled traveling line for heading for the destination.

The operation execution unit 63 executes, in cooperation with the travel control ECU 40, acceleration/deceleration control, steering control, and the like of the vehicle Am in accordance with the scheduled traveling line generated by the action determination unit 62. Specifically, the operation execution unit 63 generates a control command based on the scheduled traveling line, and sequentially outputs the control command to the travel control ECU 40.

Next, details of each of the plurality of display devices, the audio device 24, the operation device 26, and the HCU 100 included in the HMI system will be sequentially described.

The plurality of display devices include the meter display 21, a CID 22, a head-up display (hereinafter, HUD) 23, and others. The plurality of display devices may further include each of displays EMB, EML, and EMR of an electronic mirror system (see FIG. 2). The meter display 21, the CID 22, and the HUD 23 present information through the vision of the driver.

The meter display 21 and the CID 22 mainly include, for example, a liquid crystal display, an organic light emitting diode (OLED) display, or the like. The meter display 21 and the CID 22 display various images on the display screens on the basis of control signals and video data acquired from the HCU 100. The meter display 21 is installed, for example, in front of the driver's seat. The CID 22 is installed in a central portion of the instrument panel 9. As an example, the CID 22 is designed as a vertically long display having a length of 10 inches or more. The display screen of the CID 22 may be curved in a curved shape. Furthermore, the display screen of the CID 22 may be continuous with the display screen of the meter display 21. The CID 22 has the function of a touch panel, and detects a touch operation on the display screen by, for example, the driver or the like, specifically, an operation or the like, such as a tap, a flick, a pinch, or a swipe.

The HUD 23 projects the light of an image formed in front of the driver onto a projection area PA defined on a windshield WS or the like on the basis of the control signal and video data acquired from the HCU 100. The light of the image that has been reflected toward the vehicle interior by the windshield WS is perceived by the driver seated in the driver's seat. Thus, the HUD 23 displays a virtual image in a space in front of the projection area PA. The driver visually recognizes the virtual image in an angle of view VA displayed by the HUD 23 by superimposing the virtual image on the foreground of the vehicle Am.

The audio device 24 includes a plurality of speakers installed in the vehicle interior in an arrangement surrounding the driver's seat. The audio device 24 allows the speakers to reproduce notification sound, a voice message, or the like in the vehicle interior on the basis of the control signal and voice data acquired from the HCU 100. The audio device 24 presents information through the ears of the driver.

The operation device 26 is an input unit that receives a user operation by a driver or the like. The user operation or the like related, for example, to the operation and stop of the autonomous driving function is input to the operation device 26. The operation device 26 includes a steering switch provided on a spoke portion of a steering wheel, an operation lever provided on a steering column portion, a voice input device that recognizes utterance content of the driver, and the like.

Note that a user terminal or the like, such as a smartphone, may be connected to the in-vehicle network 1 or the HCU 100. The user terminal functions as an interface device, and can replace at least one of the display device, the audio device 24, and the operation device 26. Instead of the locator 35, the user terminal may additionally provide the position information, the direction information, the map data, and the like to the driving assistance ECU 50a and the autonomous driving ECU 50b.

The HCU 100 is an in-vehicle computer that controls the meter display 21, the CID 22, the HUD 23, and the audio device 24 in the HMI system. The HCU 100 functions as a control device that integrally manages information presentation to the driver. The HCU 100 mainly includes a control circuit including a processing unit 11, a RAM 12, a storage unit 13, an I/O interface 14, a bus that connects them, and the like.

The processing unit 11 is hardware for arithmetic processing that is coupled with the RAM 12. The processing unit 11 includes at least one of arithmetic cores such as a CPU and a GPU. The processing unit 11 may further include an FPGA, an NPU, an IP core having another dedicated function, and the like. The RAM 12 may include a video RAM for generating video data. The processing unit 11 executes various processing to realize the control method of the present disclosure by accessing the RAM 12. The storage unit 13 includes a non-volatile storage medium. The storage unit 13 stores various programs (a presentation control program, etc.) to be executed by the processing unit 11.

The HCU 100 includes a plurality of functional units that execute the presentation control program stored in the storage unit 13 by the processing unit 11 to integrally control presentation of information to the driver that uses each display device and the audio device 24. Specifically, functional units, such as an information acquisition unit 71, an integrated state estimation unit 73, and a provision control unit 74, are built in the HCU 100.

The information acquisition unit 71 acquires vehicle information indicating a state of the vehicle Am from the communication bus 99. The vehicle information includes, for example, the vehicle speed information, status information indicating the state of the autonomous driving function, and the like. The information acquisition unit 71 acquires operation information indicating the content of the user operation from the CID 22, the operation device 26, or the like. The information acquisition unit 71 acquires state information on the driver from the driver monitor 29.

In addition, the information acquisition unit 71 acquires information necessary for generating video data to be displayed on the display device. Specifically, the information acquisition unit 71 acquires video data to be displayed as back monitor video BM (see FIG. 5, etc.) from the camera unit 31 that photographs the rear or the rear side. The information acquisition unit 71 acquires the locator information, the map data, the route information, and the like necessary for generating a navigation map MP (see FIG. 4, etc.). Note that the video data of the navigation map MP may be generated with a predetermined resolution by the navigation system, a smartphone, or the like connected to the communication bus 99 and provided to the information acquisition unit 71.

Figure 4:
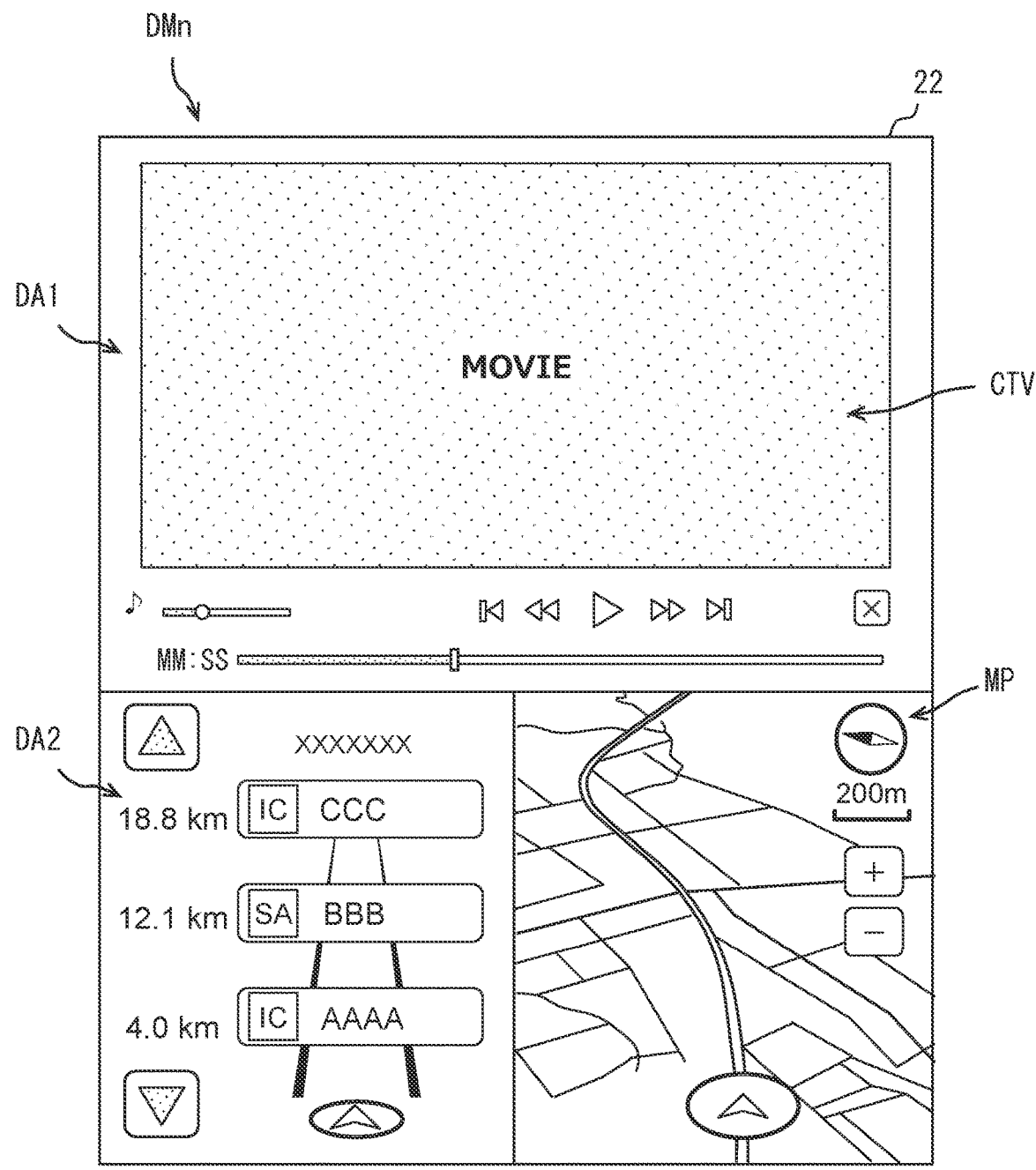
FIG. 4 is a view illustrating a display example of a CID in a second task mode.

The information acquisition unit 71 also acquires content data (video file, etc.) necessary for entertainment display, such as a video content CTV (see FIG. 4, etc.). The content data is provided to the information acquisition unit 71 by a television tuner mounted on the vehicle Am, an external medium electrically connected to the HCU 100, and a user terminal, such as a smartphone, paired with the HCU 100.

The integrated state estimation unit 73 acquires, from the information acquisition unit 71, the state information on the driver generated by the driver monitor 29. The integrated state estimation unit 73 determines the type of a second task executed by the driver in at least the autonomous cruising period. Specifically, the integrated state estimation unit 73 identifies, among a plurality of types of second task types assumed in advance, the second task currently executed by the driver.

Here, the second task will be further described. The autonomous driving ECU 50b and the HCU 100 temporarily permit the driver to execute an act other than driving. More specifically, by the level 3 autonomous driving function by the autonomous driving ECU 50b, a driver, who is not obliged to monitor the periphery in the autonomous cruising period in which the vehicle Am automatically travels, can be permitted to perform a specific act (second task) that is an act other than driving and specified in advance. The driver in this case is a person (passenger) who takes over, when leaving the limited area or in an emergency, the driving control right from the autonomous driving system 50. Until a request for executing a driving operation by the autonomous driving system 50, that is, a request for a change of driver (take over request) occurs, the driver can be legally permitted to execute the second task.

The second task can be called a secondary activity, other activity, or the like. The second task is supposed to not interfere with the driver dealing with a driving operation takeover request from the autonomous driving system 50. For example, watching of entertainment contents such as the video content CTV (see FIG. 4, etc.) and an audio book, operation of a smartphone or the like, and other acts (such as eating) are assumed in advance as the second task.

The integrated state estimation unit 73 refers to reproduction information on a content by the provision control unit 74, operation information transmitted from a smartphone or the like, and the like, and identifies the second task being executed by combining with the state information from the driver monitor 29. The integrated state estimation unit 73 may be capable of estimating, by using, for example, a determination device (determination logic) generated by machine learning or the like, the second task executed by the driver from an image captured by the near-infrared camera.

Note that the processing to identify the second task executed by the driver may be executed by the driver monitor 29. In such a mode, the integrated state estimation unit 73 acquires information indicating the type of the second task generated by the driver monitor 29 through the communication bus 99 and the information acquisition unit 71.

The provision control unit 74 integrally controls provision of information to the driver that uses each display device and the audio device 24. The provision control unit 74 can change the display size and the display layout of each content to be displayed on each display device depending on a priority set for each content. As an example, as the content has a higher priority, the provision control unit 74 makes the display size larger or allows the content to be displayed closer to the screen in terms of appearance.

Specifically, the provision control unit 74 has a mediation function of mediating information to be presented to the driver, and a data generation function of generating video data and voice data on the basis of a mediation result. As the mediation function, the provision control unit 74 sets the above priority for each content to be a provision candidate on the basis of various acquired information acquired by the information acquisition unit 71. The provision control unit 74 selects the content determined to have a high priority as a target to be provided to the driver. As the data generation function, the provision control unit 74 generates a control signal and video data to be provided to each display device and a control signal and voice data to be provided to the audio device 24 on the basis of a result of selecting the content. The provision control unit 74 sequentially outputs the generated control signal, video data, voice data, and others to each presentation device.

In the autonomous cruising period in which the execution of the second task is permitted, the provision control unit 74 displays the video in a second task mode DMn including the entertainment content, such as the video content CTV, on the screen of the CID 22, as illustrated in, for example, FIG. 4. The display of the second task mode DMn includes, as an example, the video content CTV and the navigation map MP. The provision control unit 74 uses the screen of the vertically long CID 22 by dividing the screen into two upper and lower screen areas. The video content CTV is displayed in the upper screen area (hereinafter, main display area DA1) so as to be easily visually recognized by the driver. On the other hand, the navigation map MP is displayed in the lower screen area (hereinafter, sub display area DA2).

Note that the content to be displayed together with the video content CTV and the like in the second task mode DMn may be appropriately changed. In addition, the video content CTV may be displayed on the entire screen of the CID 22 in the second task mode DMn. Furthermore, the content to be displayed in the second task mode DMn may be settable in advance by the driver or the like.

While the driver is executing such a second task, the driver's attention is away from a driving operation. Therefore, during the execution of the second task, the driver is likely to feel anxious about a change in behavior in the autonomous cruising control by the autonomous driving ECU 50b. As an example, in a situation where the emergency vehicle Qs (see FIG. 8, etc.) is approaching the vehicle Am (hereinafter, also referred to as the subject vehicle) in the autonomous cruising period, it is difficult for the driver in the state of the second task to notice the approach of the emergency vehicle Qs. As a result, there is a possibility that a change in behavior dealing with the approach of the emergency vehicle Qs may cause anxiety to the driver.

In order to avoid such a situation, the HCU 100 and the autonomous driving ECU 50b execute processing to deal with the emergency vehicle Qs approaching the subject vehicle. Hereinafter, details of the operations of the HCU 100 and the autonomous driving ECU 50b related to dealing with the emergency vehicle Qs will be sequentially described with reference to FIGS. 1 to 3.

Note that the emergency vehicle Qs includes, for example, at least one of a fire vehicle, an emergency vehicle, and a police vehicle. The "emergency vehicle Qs" in the present disclosure indicates the emergency vehicle Qs traveling for emergency service unless otherwise specified.

Figure 5:
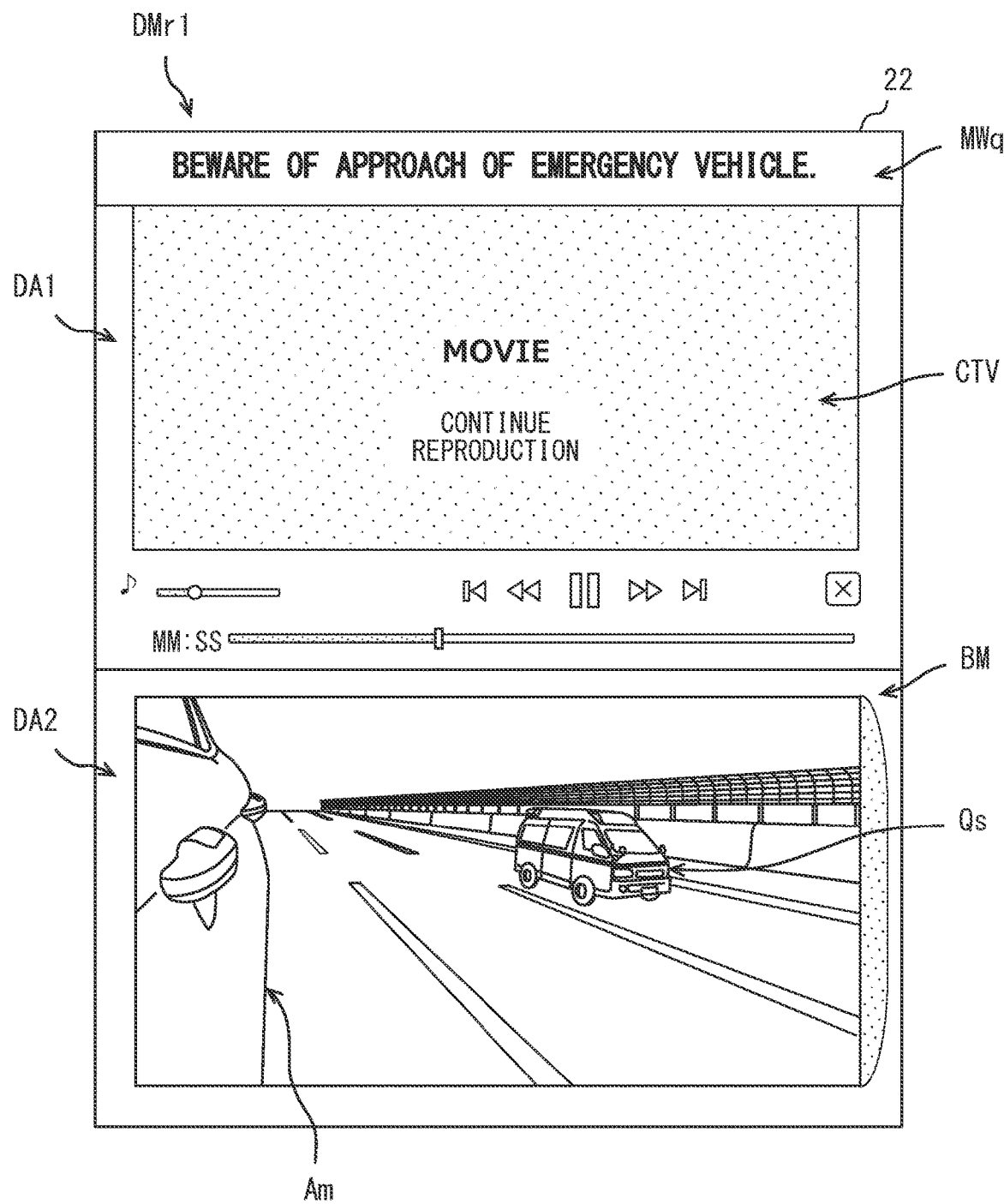
FIG. 5 is a view illustrating a display example of the CID in a case where continuation of a second task is permitted in a scene where an emergency vehicle is approaching.
Figure 6:
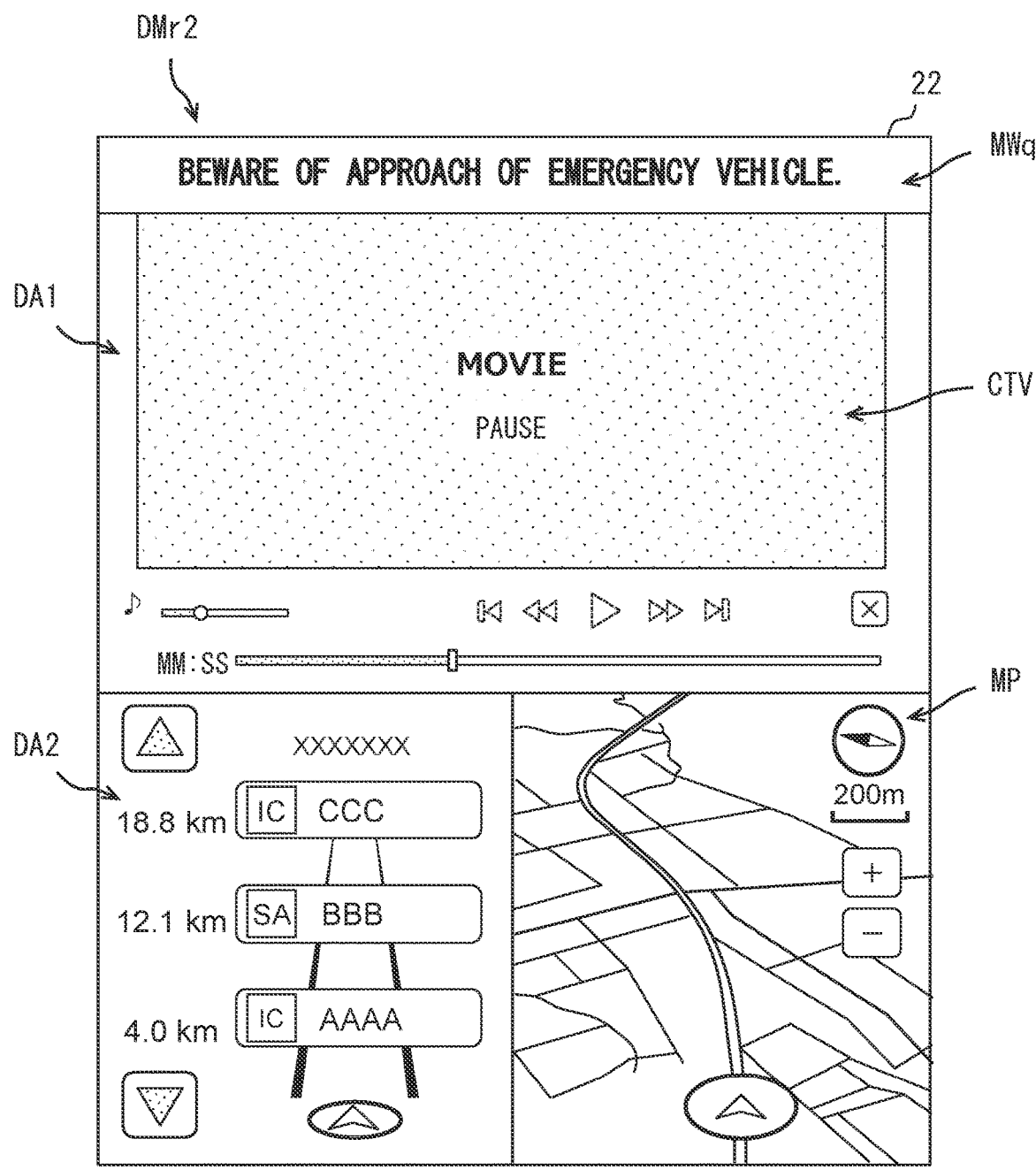
FIG. 6 is a view illustrating a display example of the CID in a case where the continuation of the second task is not permitted in a scene where an emergency vehicle is approaching.
Figure 7:
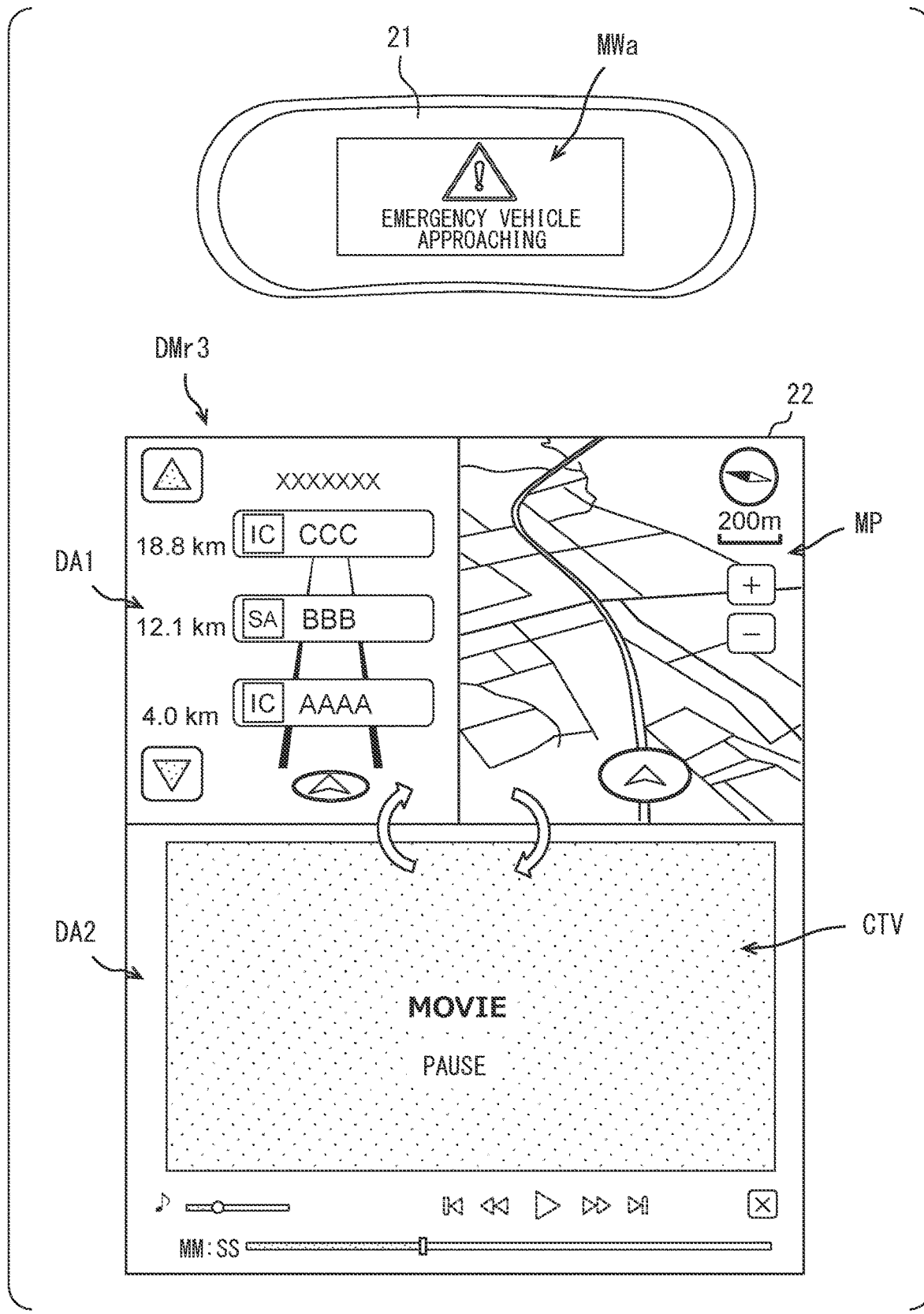
FIG. 7 is a view illustrating a display example of the CID in a case where level 3 autonomous driving is restricted in a scene where an emergency vehicle is approaching.

As illustrated in FIGS. 5 to 7, the provision control unit 74 restricts, by the mediation function, the provision of the entertainment content by the second task mode DMn. The provision control unit 74 restricts the provision of the entertainment content in a stepwise manner. As an example, the provision control unit 74 switches the strength of the restriction on the provision of the content among four stages including an unrestricted state (see FIG. 4).

A restricted display mode DMr1 illustrated in FIG. 5 is a display mode in a case where the restriction on the provision of the entertainment content is the weakest. The restricted display mode DMr1 is selected in a scene where the level 3 autonomous driving will be continued in the future and a change in behavior in the subject vehicle due to the approach of the emergency vehicle Qs is unlikely to occur.

In the restricted display mode DMr1, an emergency vehicle notification MWq is displayed in the main display area DA1. The emergency vehicle notification MWq is a display object including an alert message such as "BEWARE OF APPROACH OF EMERGENCY VEHICLE". The emergency vehicle notification MWq is displayed in a horizontally long belt shape in the vicinity of the upper edge of the main display area DA1. The emergency vehicle notification MWq is superimposed on a part of the video content CTV in the main display area DA1. Most of the video content CTV is displayed without being hidden in the emergency vehicle notification MWq. In addition, even when the emergency vehicle notification MWq is displayed, the reproduction of the video and voice of the video content CTV is continued. Therefore, watching of the video content CTV by the driver can be continued without being substantially disturbed by the additional display of the emergency vehicle notification MWq.

In addition, in the restricted display mode DMr1, the back monitor video BM is displayed in the sub display area DA2 instead of the navigation map MP (see FIG. 4). The back monitor video BM is video of the rear or the rear side that has been photographed by the camera unit 31. The provision control unit 74 can appropriately switch the camera unit 31 to serve as a providing source of the back monitor video BM such that the emergency vehicle Qs approaching the subject vehicle appears on the screen. The provision control unit 74 may generate the back monitor video BM by connecting the video data of a plurality of the camera units 31. Together with the emergency vehicle notification MWq, the back monitor video BM notifies the driver of the approach of the emergency vehicle Qs. In addition, when the back monitor video BM is displayed side by side with the video content CTV, the driver can grasp a situation in which the emergency vehicle Qs is approaching, without actually looking around the subject vehicle, in other words, without interrupting the watching of the video content CTV.

A restricted display mode DMr2 illustrated in FIG. 6 is a display mode in a case where the restriction on the provision of the entertainment content is moderate. The restricted display mode DMr2 is selected in a scene where while the level 3 autonomous driving is continued in the future, a change in behavior in the subject vehicle due to the approach of the emergency vehicle Qs is likely to occur. The restricted display mode DMr2 is a display mode for guiding the attention of the driver watching the video content CTV to the periphery of the subject vehicle.

In the restricted display mode DMr2, the emergency vehicle notification MWq is displayed in the main display area DA1 similarly to the restricted display mode DMr1 (see FIG. 5). At this time, a voice message, such as "BEWARE OF APPROACH OF EMERGENCY VEHICLE", is reproduced by the audio device 24. On the other hand, the reproduction of the video of the video content CTV is paused in the restricted display mode DMr2, unlike the restricted display mode DMr1.

In addition, in the restricted display mode DMr2, display switching from the navigation map MP to the back monitor video BM (see FIG. 5) is not executed. If the back monitor video BM is displayed on the CID 22, it is difficult for the driver to pay attention to the periphery of the subject vehicle. Therefore, in the restricted display mode DMr2, the display of the navigation map MP is continued.

Note that, in a case where a television video, an audio book, or the like is provided as the entertainment content, reproduction of the voice of the content may be restarted after the reproduction of a voice message to alert the emergency vehicle Qs is completed, in consideration of convenience for a user. In this case, the playback volume is desirably more reduced than that before the switching to the restricted display mode DMr2 such that the driver can easily hear the siren sound or the like of the emergency vehicle Qs.

A restricted display mode DMr3 illustrated in FIG. 7 is a display mode in a case where the restriction on the provision of the entertainment content is maximized. The restricted display mode DMr3 is selected when the level 3 autonomous driving is ended, in other words, in a scene where the take over request occurs or a scene where the take over request has occurred.

In the restricted display mode DMr3, the reproductions of the video and voice of the video content CTV are both stopped. As a result, the watching of the video content CTV by the driver is forcibly terminated by the determination of the system side. In addition, the provision control unit 74 replaces the display content in the main display area DA1 with the display content in the sub display area DA2. As a result, the paused video content CTV is moved to the sub display area DA2. On the other hand, the navigation map MP is moved to the main display area DA1.

Furthermore, the provision control unit 74 allows at least one of the meter display 21 and the HUD 23 (see FIG. 1) to display an emergency vehicle warning MWa. The emergency vehicle warning MWa is a display object including a warning message such as "EMERGENCY VEHICLE APPROACHING". The warning by the emergency vehicle warning MWa is stronger than the alert by the emergency vehicle notification MWq (see FIG. 6). The emergency vehicle warning MWa is displayed at the center of the screen of the meter display 21 or at the center of the angle of view VA (see FIG. 1) of the HUD 23 so as to be easily visually recognized by the driver looking around the subject vehicle. In addition, the provision control unit 74 allows the audio device 24 to reproduce a voice message such as "emergency vehicle is approaching".

The provision control unit 74 can change a method of notifying or warning the approach of the emergency vehicle Qs depending on the type of the second task being executed that is determined by the integrated state estimation unit 73. As an example, when the integrated state estimation unit 73 determines that a smartphone or the like is being operated, the provision control unit 74 displays a display object corresponding to the emergency vehicle notification MWq or the emergency vehicle warning MWa on the screen of the smartphone. In addition, when the driver is executing an act such as eating, the provision control unit 74 provides a notification of the approach of the emergency vehicle Qs by a method such as reproducing a voice message or reducing the volume of the video content CTV. Furthermore, the provision control unit 74 may change whether to end the second task itself or restrict a part thereof depending on the type of the second task being executed.

The display mode switching control by the HCU 100 described above is realized by cooperation with the autonomous driving ECU 50b illustrated in FIGS. 1 and 3. Hereinafter, the functions of the environment recognition unit 61 and the action determination unit 62 related to dealing with the emergency vehicle Qs will be described in detail.

In an autonomous cruising period in which at least level 3 autonomous driving is performed, the environment recognition unit 61 determines presence/absence of the approach of the emergency vehicle Qs to the subject vehicle. In order to grasp a situation in which the emergency vehicle Qs is approaching the subject vehicle, the environment recognition unit 61 includes an emergency vehicle detection unit 65, a lane grasping unit 66, and a road condition grasping unit 67 as auxiliary functional units based on the autonomous driving control program.

The emergency vehicle detection unit 65 detects the approach of the emergency vehicle Qs to the subject vehicle by using acquired information acquired from a plurality of sources of information. In addition, when detecting the approach of the emergency vehicle Qs, the emergency vehicle detection unit 65 further detects the type, relative position, moving direction, and others of the emergency vehicle Qs as detailed information on the emergency vehicle Qs. The emergency vehicle detection unit 65 provides, as emergency vehicle information, a detection result of and the detailed information on the emergency vehicle Qs to the action determination unit 62.

The emergency vehicle detection unit 65 can acquire the emergency vehicle information through the inter-vehicle communication and the road-to-vehicle communication. During emergency service, the emergency vehicle Qs can transmit information, such as the current position, the traveling speed, and the scheduled traveling route, to the traffic control center and other surrounding vehicles by using at least one of the inter-vehicle communication, the road-to-vehicle communication, and mobile communication. Therefore, the inter-vehicle communication device 37 receives the emergency vehicle information by inter-vehicle communication with the emergency vehicle Qs. The road-to-vehicle communication device 38 receives, through the road-to-vehicle communication with the roadside device, the emergency vehicle information on the approaching emergency vehicle Qs that has been distributed by, for example, the traffic control center. Upon receiving the emergency vehicle information, the inter-vehicle communication device 37 and the road-to-vehicle communication device 38 provide the received emergency vehicle information to the emergency vehicle detection unit 65.

In addition, the emergency vehicle detection unit 65 can acquire the emergency vehicle information on the basis of the detected information of the periphery monitoring sensor 30. The emergency vehicle detection unit 65 detects the approach of the emergency vehicle Qs by extracting the emergency vehicle Qs appearing in the captured data by the camera unit 31 using a method such as pattern matching. The emergency vehicle detection unit 65 tracks changes in the position and size of the emergency vehicle Qs appearing in the captured data over time, and generates the detailed information on the emergency vehicle Qs.

Furthermore, the emergency vehicle detection unit 65 extracts the sound of the siren emitted by the emergency vehicle Qs from the environmental sound collected by the microphone 33. When extracting the siren sound having a pattern specified in advance from the environmental sound, the emergency vehicle detection unit 65 detects the approach of the emergency vehicle Qs. The emergency vehicle detection unit 65 generates the detailed information on the emergency vehicle Qs from the changes in the volume and frequency of the siren sound.

In addition, the emergency vehicle detection unit 65 recognizes voices, such as "ambulance is passing" and "entering the intersection", emitted from the loudspeaker of the emergency vehicle Qs. The emergency vehicle detection unit 65 can generate character data obtained by converting the recognized voices into characters and provide the character data to the HCU 100.

The lane grasping unit 66 identifies an emergency vehicle lane Lnq (see FIG. 8) on which the emergency vehicle Qs travels, on the basis of the position information on the emergency vehicle Qs that has been grasped by the emergency vehicle detection unit 65. The lane grasping unit 66 grasps the positional relationship between the subject vehicle lane Lns (see FIG. 8) on which the subject vehicle travels and the emergency vehicle lane Lnq on the basis of the locator information on the subject vehicle. Specifically, the lane grasping unit 66 grasps whether the subject vehicle lane Lns is the emergency vehicle lane Lnq (see FIG. 13), an adjacent lane Lna (see FIGS. 8 and 11), a separate lane Lnz (see FIG. 12), or an opposite lane Lno (see FIG. 18). The adjacent lane Lna is a lane adjacent to the emergency vehicle lane Lnq. The separate lane Lnz is a lane separated from the emergency vehicle lane Lnq. At least one lane exists between the separate lane Lnz and the emergency vehicle lane Lnq. Note that, in a case where there is one lane heading in the same direction on a road on which vehicles are traveling, the processing to grasp the positional relationship between the emergency vehicle lane Lnq and the subject vehicle may not be executed. In this case, it is unambiguously determined that the subject vehicle is traveling in the emergency vehicle lane Lnq.

The road condition grasping unit 67 grasps a road condition around the subject vehicle by combining the congestion information acquired through the road-to-vehicle communication, the detected information from the periphery monitoring sensor 30, the vehicle speed information, and the like. Specifically, the road condition grasping unit 67 determines whether the subject vehicle is traveling in congestion. As an example, when there is a preceding vehicle traveling in the same lane and the traveling speed is a predetermined speed (e.g., 10 km/h or less), the road condition grasping unit 67 determines that the subject vehicle is traveling in congestion. When the traveling speed exceeds a predetermined speed (e.g., 50 km/h) after the congestion determination, the road condition grasping unit 67 determines that the congestion has cleared.

In addition, the road condition grasping unit 67 determines whether all the lanes heading in the same direction are congested or whether the subject vehicle lane Lns is only congested. In other words, the road condition grasping unit 67 determines whether there is a non-congested lane Lnp (see FIG. 15) in which the emergency vehicle Qs can travel.

Figure 14:
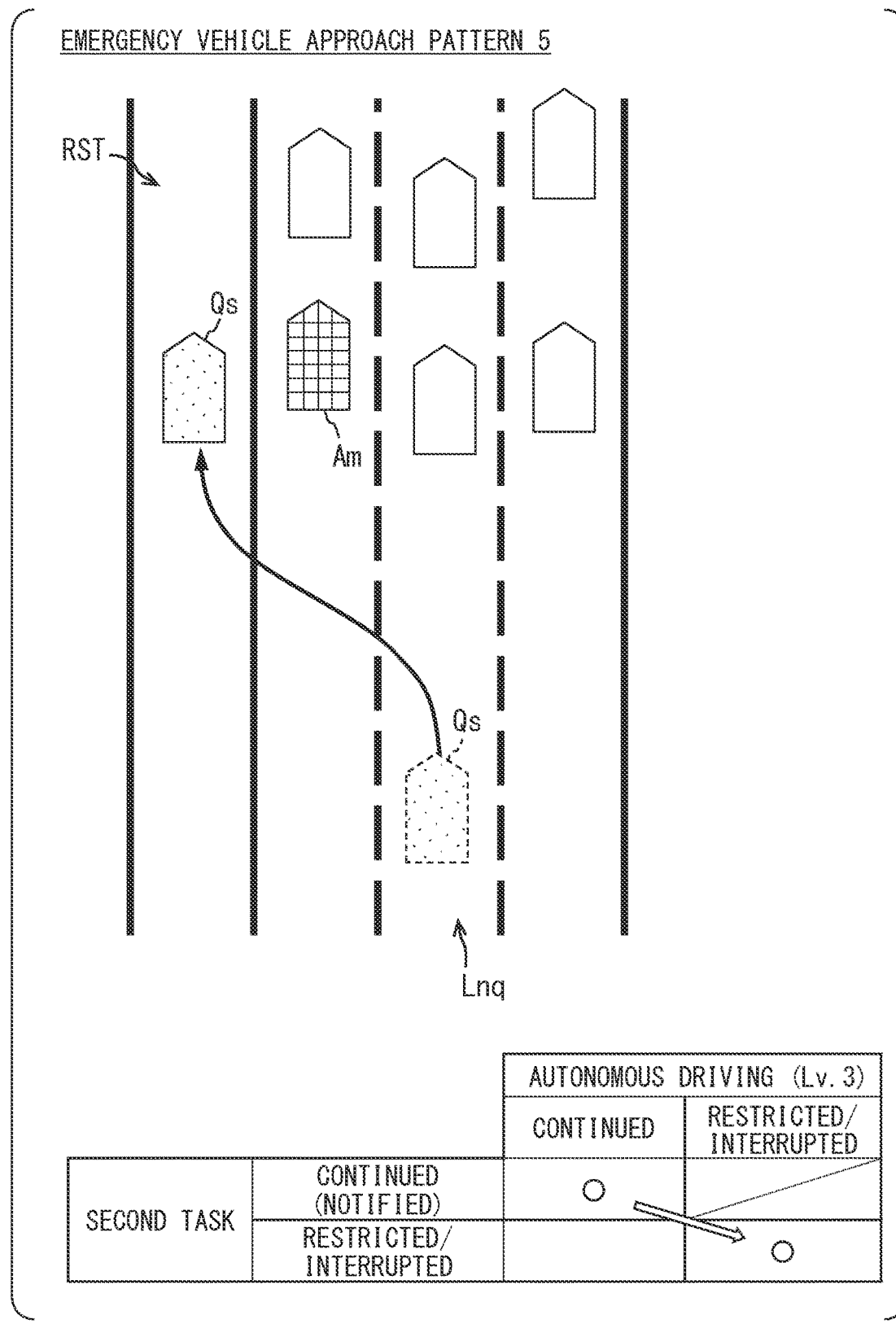
FIG. 14 is a view illustrating an example of a scene where an emergency vehicle is approaching in congestion.

Furthermore, the road condition grasping unit 67 may also be capable of grasping the state of a roadside strip RST (see FIG. 14). As an example, the road condition grasping unit 67 grasps the width of the roadside strip RST and presence/absence of another vehicle on the roadside strip RST, and determines whether the emergency vehicle Qs can travel on the roadside strip RST. In this case, the road condition grasping unit 67 determines whether the roadside strip RST can be a non-congested lane.

When the environment recognition unit 61 detects the approach of the emergency vehicle Qs, the action determination unit 62 determines whether it is necessary to restrict the level 3 autonomous driving, that is, whether it is necessary to make the take over request to the driver. In order to determine a future action of the subject vehicle dealing with the approach of the emergency vehicle Qs, the action determination unit 62 includes an automation level control unit 68 and a permission range control unit 69 as auxiliary functional units based on the autonomous driving control program.

When the approach of the emergency vehicle Qs to the subject vehicle is detected in the autonomous cruising period in which the level 3 autonomous driving is performed, the automation level control unit 68 determines whether to continue the autonomous driving being executed. The automation level control unit 68 determines whether to continue the level 3 autonomous driving on the basis of the relative position of the emergency vehicle lane Lnq grasped by the lane grasping unit 66 and the road condition around the subject vehicle grasped by the road condition grasping unit 67.

When determining that the level 3 autonomous driving is to be restricted, the automation level control unit 68 further determines the control state of autonomous driving after the level 3 autonomous cruising is canceled. Specifically, the automation level control unit 68 further determines whether to end all the autonomous driving control and switch to manual driving, or to switch to level 1 or level 2 autonomous driving. Note that, among the processing to restrict the level 3 autonomous driving, the processing to switch to manual driving is referred to as "interruption".

When determining that the level 3 autonomous driving is to be continued, the automation level control unit 68 further determines whether to maintain the traveling speed of the vehicle that is set to the autonomous driving. As an example, when the emergency vehicle Qs travels in the adjacent lane of the vehicle Am, that is, when the lane grasping unit 66 grasps that the subject vehicle lane Lns is the adjacent lane Lna, the automation level control unit 68 reduces the set speed of the autonomous driving by a predetermined amount. As a result, the set speed after the approach of the emergency vehicle Qs is changed to be lower than the set speed before the approach of the emergency vehicle Qs. For example, when traveling on an expressway, the automation level control unit 68 can change the set speed to a speed equal to or lower than the legal minimum speed on the expressway. When another vehicle Ax exists in front of the vehicle Am, however, the automation level control unit 68 can avoid the deceleration control and perform control to match the speed of the preceding another vehicle Ax. This prevents occurrence of an unnecessary risk due to sudden deceleration of only the vehicle Am.

The permission range control unit 69 controls a permission range of the second task permitted to the driver. When the approach of the emergency vehicle Qs to the subject vehicle is detected in the autonomous cruising period in which the level 3 autonomous driving is performed, the permission range control unit 69 determines whether to continue the permission state in which the second task is permitted to the driver. Similarly to the automation level control unit 68, the permission range control unit 69 determines whether to continue the second task on the basis of the relative position of the emergency vehicle lane Lnq grasped by the lane grasping unit 66 and the road condition around the subject vehicle grasped by the road condition grasping unit 67.

Specifically, when the level 3 autonomous driving is interrupted, the permission range control unit 69 determines interruption of all types of the second tasks. In addition, when it is determined to be a scene where a sudden change in behavior is likely to occur in the subject vehicle, the permission range control unit 69 also determines interruption of the second task. Furthermore, the permission range control unit 69 may be capable of designating, among a plurality of types of the second tasks, a second task to be permitted and a second task not to be permitted.

When determining interruption of the second task, the permission range control unit 69 further determines satisfaction of a cancellation condition of the interruption on the basis of the positional relationship among the vehicle Am, the emergency vehicle Qs, and the another vehicle Ax, the traveling states thereof, and the like. The permission range control unit 69 can set one or more cancellation conditions. The permission range control unit 69 can set the fact that a predetermined time has elapsed since the emergency vehicle Qs overtook (or passed) the vehicle Am as the cancellation condition. The permission range control unit 69 can set the fact that the emergency vehicle Qs that overtook the vehicle Am is separated from the vehicle Am by a predetermined distance (hereinafter, separation distance DSq, see FIG. 9) or more as the cancellation condition. The permission range control unit 69 can set the fact that the behavior of the another vehicle Ax traveling around the vehicle Am becomes stable as the cancellation condition. The permission range control unit 69 can set the fact that after the emergency vehicle Qs overtook the vehicle Am, the vehicle Am overtakes the emergency vehicle Qs again (see FIG. 10) as the cancellation condition.

A result of the determination by the automation level control unit 68 on whether to continue the autonomous driving, and a result of determining whether to continue the permission state of the second task and a result of determining whether the cancellation condition is satisfied, by the permission range control unit 69, are provided to the HCU 100 by the action determination unit 62. In addition, a result of the determination by the emergency vehicle detection unit 65 on the detection of the approach of the emergency vehicle Qs is also provided to the HCU 100 together with the result of determining whether to continue. Note that, in the following description, the result of determining whether to continue provided by the autonomous driving ECU 50*b* and the result of the determination on the detection of the approach are collectively referred to as a "continuation determination result". In addition, the result of determining whether the cancellation condition is satisfied is referred to as a "cancellation determination result".

The HCU 100 executes display control for switching the second task mode DMn and each of the restricted display modes DMr1 to DMr3 on the basis of the continuation determination result provided by the autonomous driving ECU 50*b* and the cancellation determination result. For such display control, a task continuation determination unit 72, as a functional unit that processes the continuation determination result, is further built in the HCU 100 on the basis of the provision control program.

The task continuation determination unit 72 acquires the continuation determination result output from the autonomous driving ECU 50*b* and the cancellation determination result through the communication bus 99 and the information acquisition unit 71 The task continuation determination unit 72 grasps whether the approach of the emergency vehicle Qs is detected on the basis of the result of the determination on the detection of the approach that is included in the continuation determination result. In addition, the task continuation determination unit 72 refers to the continuation determination result and determines whether the permission state, in which the second task is permitted to the driver, is continued. Furthermore, the task continuation determination unit 72 refers to the continuation determination result and further determines whether the level 3 autonomous driving is continued in the autonomous driving ECU 50*b*.

In accordance with such determination by the task continuation determination unit 72, the provision control unit 74 controls display in each display device. When the task continuation determination unit 72 determines that the level 3 autonomous driving or the permission state of the second task is not continued, the provision control unit 74 restricts display of an entertainment content to be provided to the driver in association with the second task. As described later, such restriction on the display of the content includes interrupting reproduction of at least one of the video and the voice, concealing a part of the video, reducing the volume, ending the display of the content itself, and the like.

Specifically, when the permission state of the second task is continued, the provision control unit 74 switches the display mode of the CID 22 from the second task mode DMn (see FIG. 4) to the restricted display mode DMr1 (see FIG. 5). In addition, when the level 3 autonomous driving is continued while the permission state of the second task is not continued, the provision control unit 74 switches the display mode of the CID 22 from the second task mode DMn to the restricted display mode DMr2 (see FIG. 6). Furthermore, when the level 3 autonomous driving is not continued, the provision control unit 74 switches the display mode of the CID 22 from the second task mode DMn to the restricted display mode DMr3 (see FIG. 7).

A plurality of specific examples of a pattern of the emergency vehicle Qs approaching in which the restriction on the display of the content occurs as described above and a pattern of the emergency vehicle Qs approaching in which the display of the content is not restricted will be sequentially described on the basis of FIGS. 8 to 16 and 18 and with reference to FIG. 3.

Figure 8:
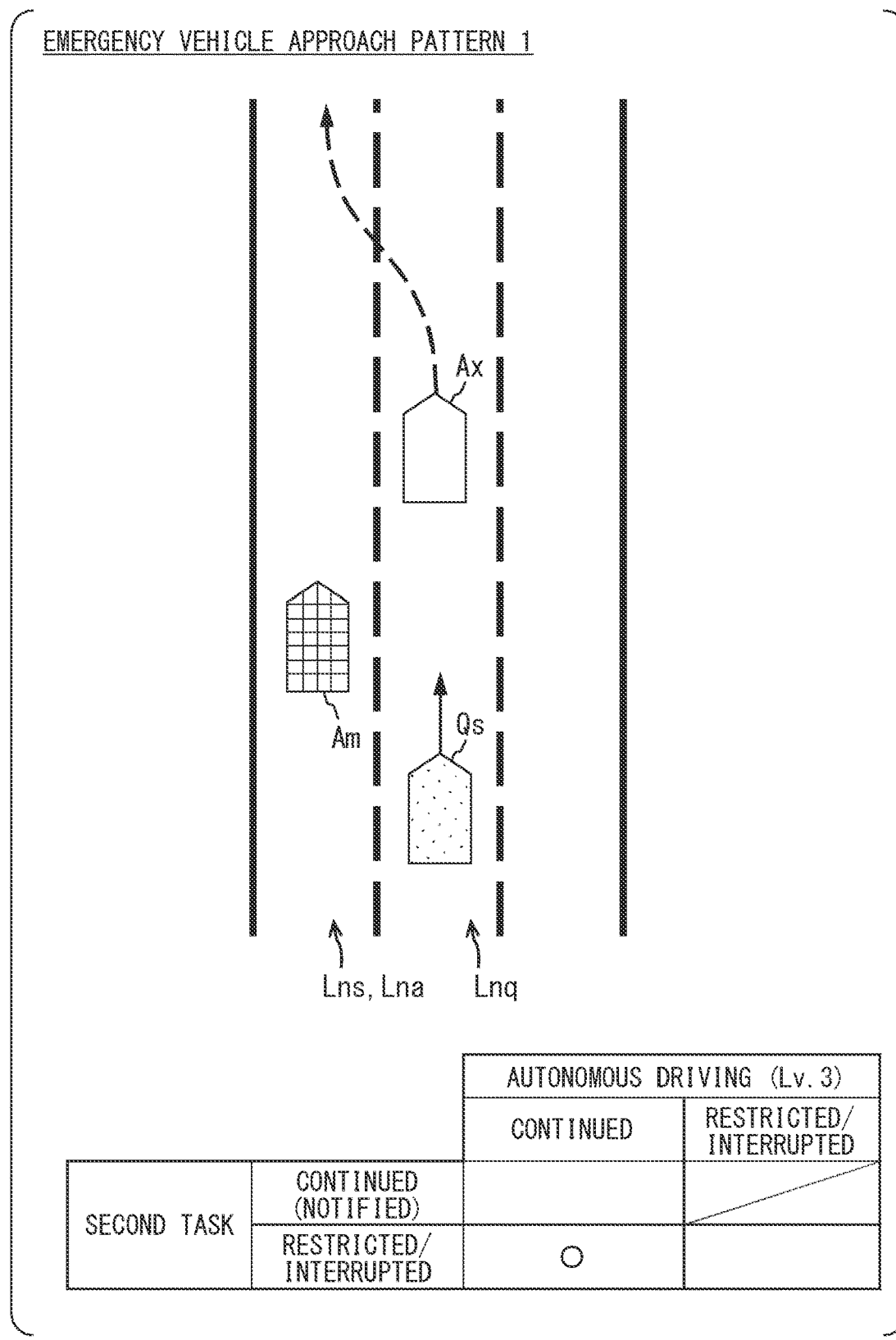
FIG. 8 is a view illustrating an example of a scene where an emergency vehicle is approaching.

In an emergency vehicle approach pattern 1 illustrated in FIG. 8, the subject vehicle (vehicle Am) is traveling in the adjacent lane Lna adjacent to the emergency vehicle lane Lnq. In this case, the continuation of the level 3 autonomous driving is permitted. On the other hand, the continuation of the second task is restricted. As an example, it is assumed that the another vehicle Ax traveling in the emergency vehicle lane Lnq changes the lane from the emergency vehicle lane Lnq to the subject vehicle lane Lns toward the front of the subject vehicle (vehicle Am) in order to secure the course of the emergency vehicle Qs. In response to such movement of the another vehicle Ax, the autonomous driving ECU 50*b* changes the set speed of the level 3 autonomous driving to be low and executes travel control for decelerating the subject vehicle. In order to allow the subject vehicle to follow the another vehicle Ax that has moved to the subject vehicle lane Lns, the autonomous driving ECU 50*b* may cancel the change of reducing the set speed. In order to direct the driver's attention to the outside of the vehicle such that occurrence of such a change in behavior is predicted, the permission range control unit 69 determines to interrupt the second task.

When the deceleration control is executed by the autonomous driving ECU 50*b*, the provision control unit 74 executes, before the deceleration control is started, a notification communicating that the traveling speed is reduced due to the approach of the emergency vehicle Qs. In addition, when receiving the continuation determination result from the action determination unit 62, the provision control unit 74 sets the display mode of the CID 22 to the restricted display mode DMr2 (see FIG. 6). As a result, the provision control unit 74 restricts the display of the video content CTV by stopping the reproduction of the video content CTV and displaying the emergency vehicle notification MWq.

Figure 9:
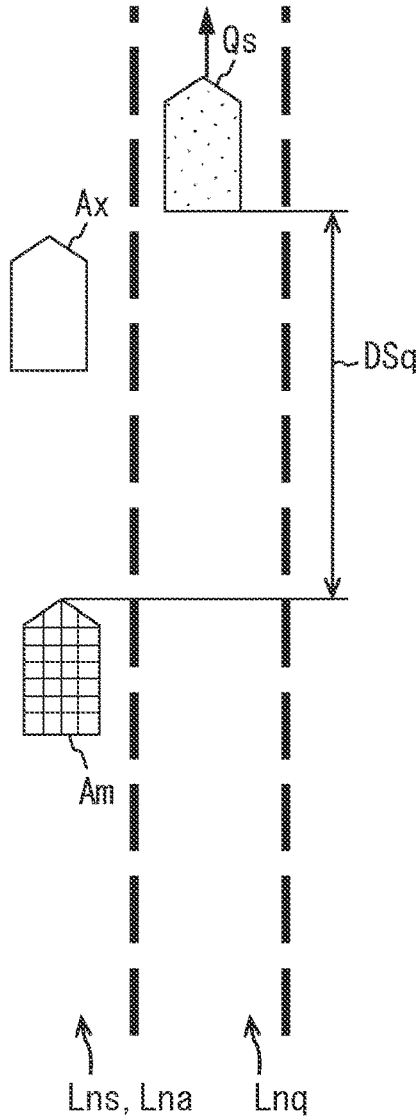
FIG. 9 is a view illustrating an example of a scene where an emergency vehicle that has approached is moving away from a subject vehicle.
Figure 10:
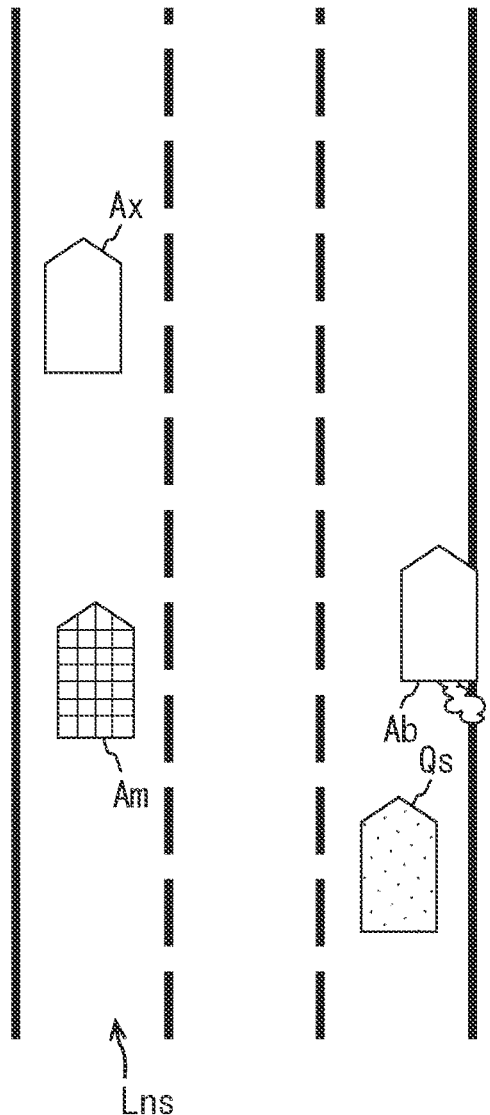
FIG. 10 is a view illustrating an example of a scene where an emergency vehicle that has approached is moving away from a subject vehicle.

After the emergency vehicle Qs overtakes the vehicle Am, as illustrated in FIGS. 9 and 10, the use of the second task is at least restricted for a predetermined time while the level 3 autonomous driving is permitted. When the display of the video content CTV is restricted, the provision control unit 74 continues the restriction on the display of the video content CTV until at least one cancellation condition is satisfied by the automation level control unit 68. The provision control unit 74 can appropriately combine a plurality of the cancellation conditions.

The provision control unit 74 sets the fact that the emergency vehicle Qs that overtook the subject vehicle is separated by the separation distance DSq (see FIG. 9) or more as the cancellation condition, and continues the restriction on the display of the video content CTV until the emergency vehicle Qs is separated from the subject vehicle by the separation distance DSq or more. The provision control unit 74 notifies the driver that the second task can be used on the basis of satisfaction of the cancellation condition associated with the securing of the separation distance DSq. The provision control unit 74 starts reproduction of the video content CTV on the basis of a user operation ordering restart of the second task.

As another example, the provision control unit 74 sets the fact that after the emergency vehicle Qs overtook the subject vehicle, the subject vehicle overtakes the emergency vehicle Qs that has stopped near a broken-down vehicle Ab, an accident vehicle, or the like (see FIG. 10) again as the cancellation condition. The provision control unit 74 continues the restriction on the display of the video content CTV until the subject vehicle again overtakes the emergency vehicle Qs, and executes a notification to permit the second task at a timing when the subject vehicle overtakes the emergency vehicle Qs.

Furthermore, the provision control unit 74 sets the fact that a predetermined time has elapsed since the emergency vehicle Qs overtook the subject vehicle as the cancellation condition, and continues the restriction on the display of the video content CTV until the predetermined time elapses. In addition, the provision control unit 74 sets the fact that the behavior of the another vehicle Ax traveling around the subject vehicle becomes stable as the cancellation condition, and restricts the display of the content until the behavior of the another vehicle Ax becomes stable. For example, when the speed of the another vehicle Ax becomes substantially constant or when an inter-vehicle distance to the another vehicle Ax becomes a target inter-vehicle distance of following travel control in a scene where the another vehicle Ax changes the lane to the front of the subject vehicle, the automation level control unit 68 determines that the behavior of the another vehicle Ax becomes stable.

Figure 11:
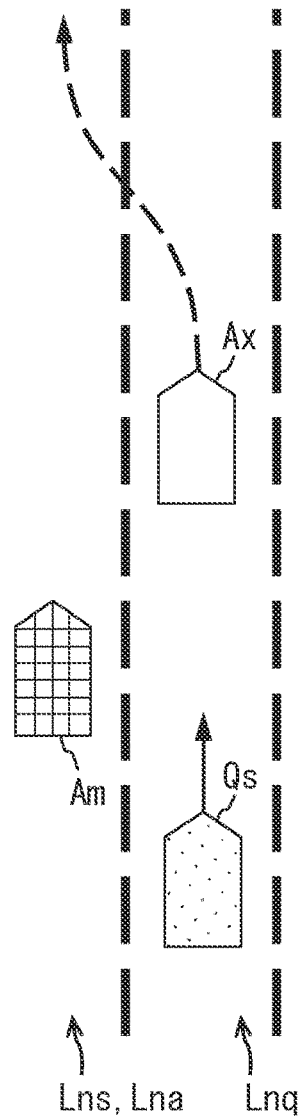
FIG. 11 is a view illustrating an example of a scene where an emergency vehicle is approaching.

In an emergency vehicle approach pattern 2 illustrated in FIG. 11, the subject vehicle (vehicle Am) is traveling in the adjacent lane Lna similarly to the above emergency vehicle approach pattern 1 (see FIG. 8). Even in such an identical scene, the automation level control unit 68 and the permission range control unit 69 can change the result of determining whether to continue by, for example, the traveling state of the another vehicle Ax traveling in front of the emergency vehicle Qs in the emergency vehicle lane Lnq or by presetting by a user.

Specifically, in the emergency vehicle approach pattern 2, not only the continuation of the second task but also the continuation of the level 3 autonomous driving is restricted. As a result, the display mode of the CID 22 is set to the restricted display mode DMr3 (see FIG. 7). As a result, the provision control unit 74 restricts the display of the video content CTV by stopping the reproduction of the video content CTV, moving the video content CTV to the sub display area DA2, or the like. In addition, the provision control unit 74 warns the driver of the presence of the approaching emergency vehicle Qs by displaying the emergency vehicle warning MWa using the meter display 21 and the HUD 23. The provision control unit 74 notifies the driver that the level 3 autonomous driving becomes available at a timing when, for example, the separation distance DSq is secured after the emergency vehicle Qs overtook the vehicle Am.

Figure 12:
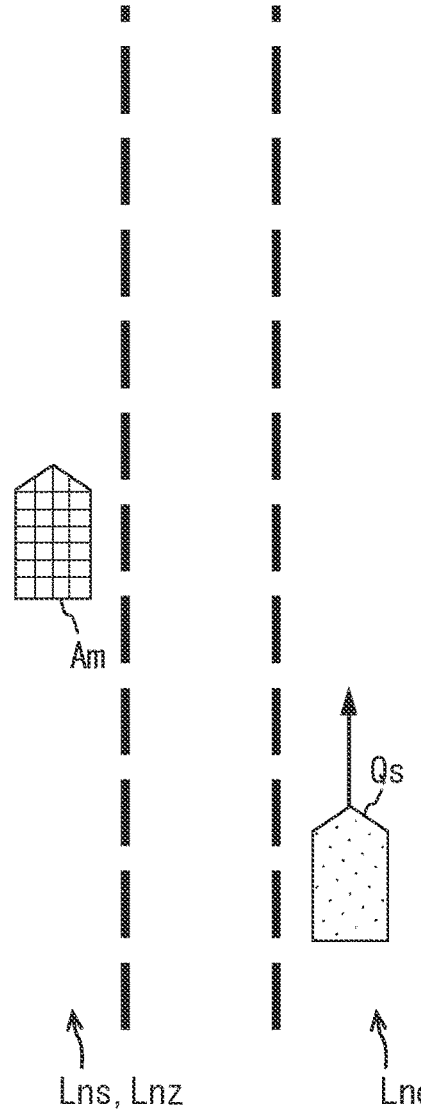
FIG. 12 is a view illustrating an example of a scene where an emergency vehicle is approaching.

In an emergency vehicle approach pattern 3 illustrated in FIG. 12, the subject vehicle (vehicle Am) is traveling in the separate lane Lnz separated from the emergency vehicle lane Lnq. In this case, the continuation of the level 3 autonomous driving is permitted. In addition, the continuation of the second task is also permitted. As a result, the display mode of the CID 22 is set to the restricted display mode DMr1 (see FIG. 5). Thus, the reproduction of the video content CTV is continued. In addition, the driver is notified of the presence of the approaching emergency vehicle Qs by the additional display of the emergency vehicle notification MWq in the main display area DA1 and the display of the back monitor video BM in the sub display area DA2.

Figure 13:
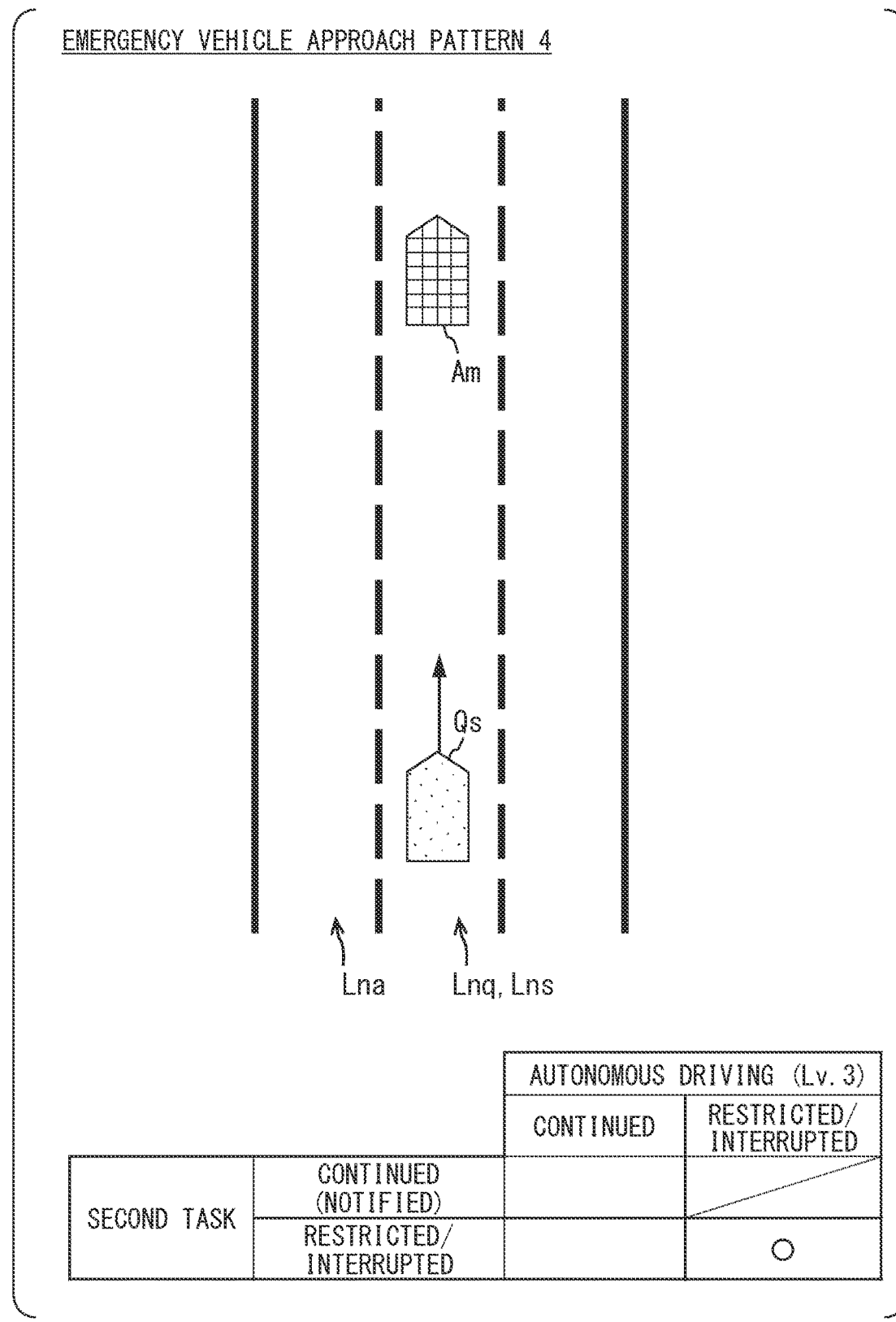
FIG. 13 is a view illustrating an example of a scene where an emergency vehicle is approaching.

In an emergency vehicle approach pattern 4 illustrated in FIG. 13, the subject vehicle (vehicle Am) is traveling in the emergency vehicle lane Lnq. In the emergency vehicle approach pattern 4, it is considered that a desirable action of the subject vehicle is to retreat from the emergency vehicle lane Lnq by changing the lane to the adjacent lane Lna. Therefore, in the action determination unit 62, not only the continuation of the second task but also the continuation of the level 3 autonomous driving is restricted. In addition, the automation level control unit 68 restricts the activation of an LCA function by the autonomous driving ECU 50b or the driving assistance ECU 50a. This is because the lane change by the autonomous driving function requires a longer time than the lane change by manual driving and the use of the LCA function hinders quick retreat from the emergency vehicle lane Lnq.

In the above emergency vehicle approach pattern 4, the display mode of the CID 22 is set to the restricted display mode DMr3 (see FIG. 7) in response to the continuation determination result that restricts both the autonomous driving and the second task. As a result, the display of the video content CTV is restricted. In addition, the driver is warned of the presence of the approaching emergency vehicle Qs by the display of the emergency vehicle warning MWa using the meter display 21 and the HUD 23.

Here, in the emergency vehicle approach pattern 4, the driver can execute, before occurrence of the takeover request for the driving operation, the lane change to retreat to the adjacent lane Lna by override to voluntarily acquire the control right. In this case, the level 3 autonomous driving is in a paused state, and the action determination unit 62 shifts the control state to manual driving or the level 1 driving control by an ACC function.

In an emergency vehicle approach pattern 5 illustrated in FIG. 14, the subject vehicle (vehicle Am) is traveling in congestion. In addition, in the emergency vehicle approach pattern 5, all the lanes included in a road on which the subject vehicle is traveling are congested. In this case, the action determination unit 62 also permits the continuation of the second task in addition to the continuation of the level 3 autonomous driving. From the above, the display mode of the CID 22 is set to the restricted display mode DMr1 (see FIG. 5). As a result, while the reproduction of the video content CTV is continued, the driver is notified of the presence of the approaching emergency vehicle Qs by the additional display of the emergency vehicle notification MWq in the main display area DA1 and the display of the back monitor video BM in the sub display area DA2.

Furthermore, in the emergency vehicle approach pattern 5, the action determination unit 62 changes the determination on whether to continue the autonomous driving and the second task from the positional relationship between the subject vehicle and the emergency vehicle Qs. Specifically, when the emergency vehicle Qs is approaching the subject vehicle, the action determination unit 62 restricts the continuations of the autonomous driving and the second task. As an example, the emergency vehicle Qs can pass through a congested section by traveling on the roadside strip RST. Assuming such a scene, when the emergency vehicle Qs heading for the roadside strip RST is approaching the subject vehicle, the action determination unit 62 restricts both the continuations of the second task and the autonomous driving and switches to a state in which the driver is allowed to deal with.

In response to the above continuation determination result, the display mode of the CID 22 is set to the restricted display mode DMr3 (see FIG. 7). As a result, the display of the video content CTV is restricted. In addition, the emergency vehicle warning MWa is displayed on the meter display 21 and the HUD 23. In this way, the driver is urged to take a measure to retreat from the course of the emergency vehicle Qs heading for the roadside zone RST.

Figure 15:
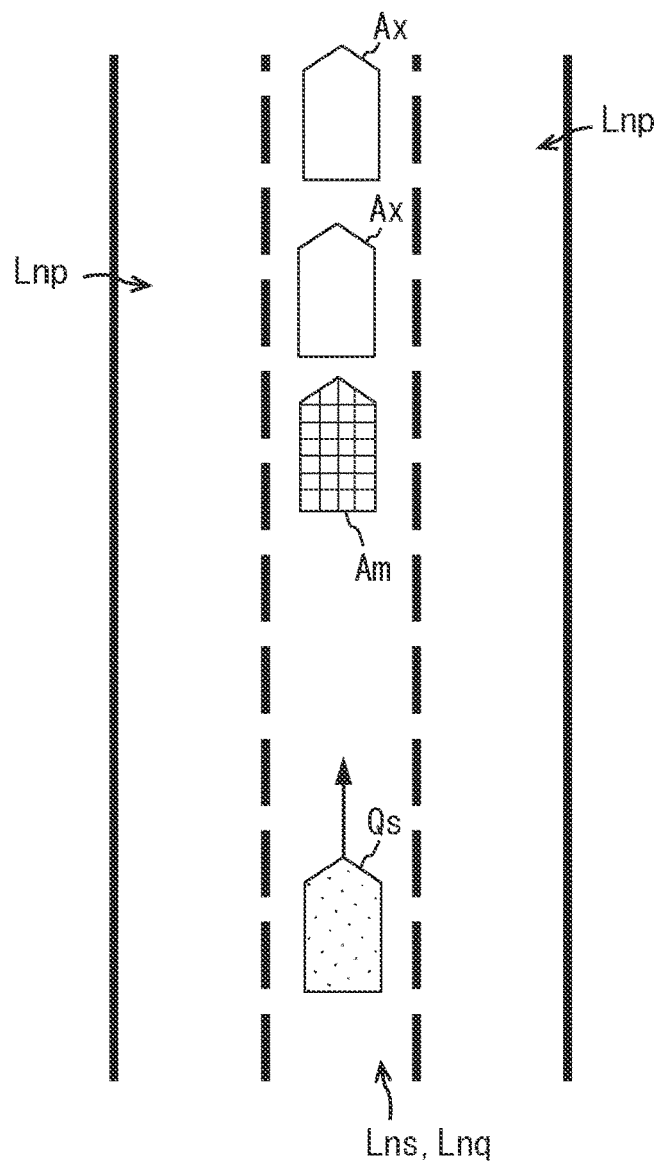
FIG. 15 is a view illustrating an example of a scene where an emergency vehicle is approaching in congestion.

In an emergency vehicle approach pattern 6 illustrated in FIG. 15, the subject vehicle (vehicle Am) is traveling in congestion. In addition, in the emergency vehicle approach pattern 6, only the subject vehicle lane Lns is congested among a plurality of lanes included in a road, and there is the non-congested lane Lnp in which the emergency vehicle Qs can travel. In this case, the continuation of the level 3 autonomous driving is permitted. On the other hand, the continuation of the second task is restricted.

As an example, when the emergency vehicle Qs moves to the non-congested lane Lnp, another vehicle traveling in the non-congested lane Lnp tries to cut into a congested line in front of the subject vehicle in order to secure the course of the emergency vehicle Qs. Such movement of the another vehicle easily causes a sudden change in behavior in the subject vehicle. Therefore, the permission range control unit 69 restricts the continuation of the second task so as to direct the driver's attention to the outside of the vehicle.

In response to the above continuation determination result, the display mode of the CID 22 is set to the restricted display mode DMr2 (see FIG. 6). As a result, the provision control unit 74 displays the emergency vehicle notification MWq while the reproduction of the video content CTV is stopped, and guides the driver's attention to the approaching emergency vehicle Qs.

Figure 16:
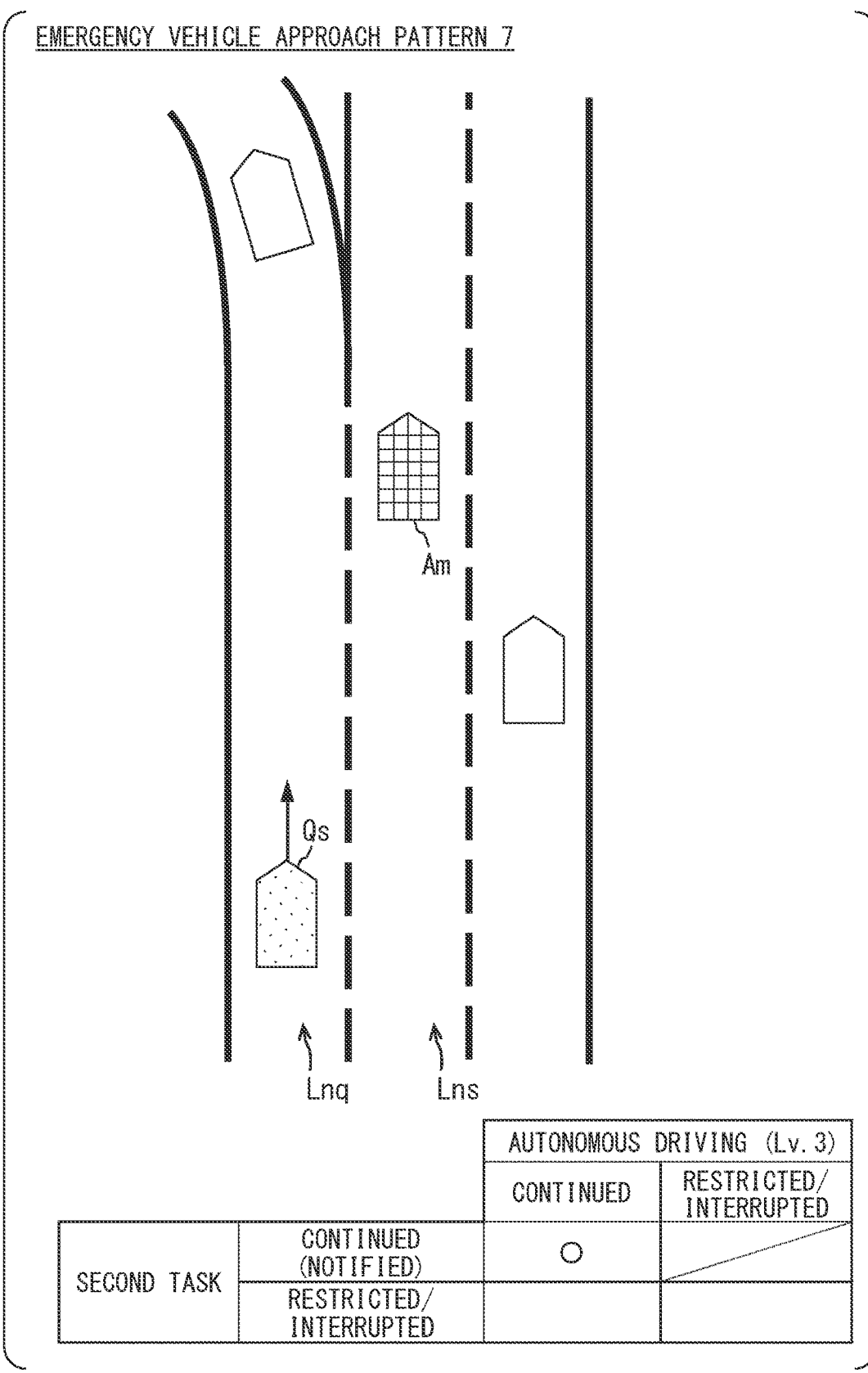
FIG. 16 is a view illustrating an example of a scene where a subject vehicle can retreat from a scheduled traveling route for the approaching emergency vehicle.

In an emergency vehicle approach pattern 7 illustrated in FIG. 16, the emergency vehicle Qs is scheduled to leave the main roadway. On the other hand, the subject vehicle (vehicle Am) continues traveling on the main roadway. When the scheduled traveling route for the emergency vehicle Qs is acquired, the action determination unit 62 determines whether the subject vehicle can retreat from the scheduled traveling route for the emergency vehicle Qs. When determining that the subject vehicle can retreat from the scheduled traveling route for the emergency vehicle Qs, the action determination unit 62 allows both the level 3 autonomous driving and the permission state of the second task to be continued.

Figure 17:
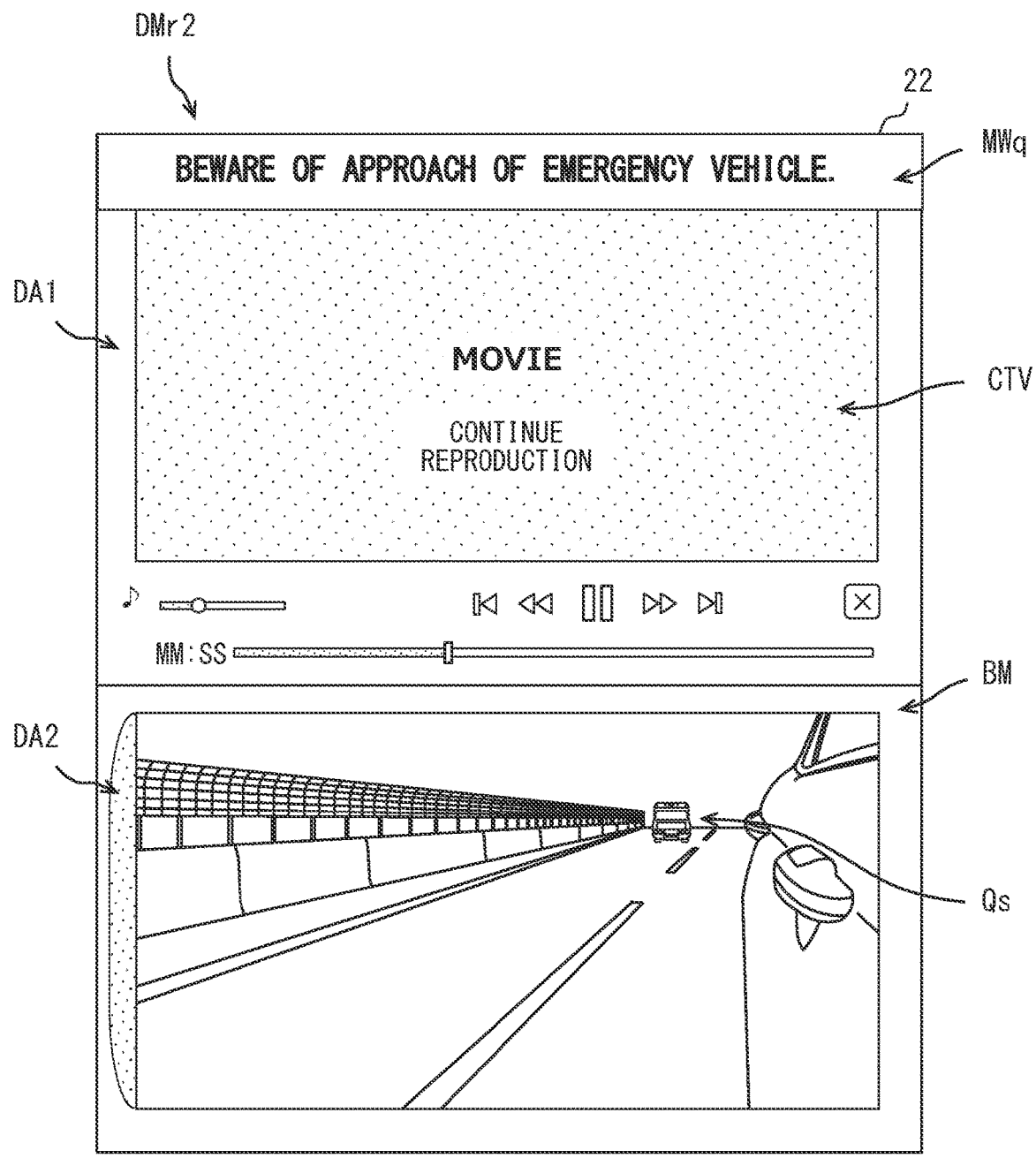
FIG. 17 is a view illustrating a modification of the display illustrated in FIG. 5, which is a display example of the CID in the scene illustrated in FIG. 16.

In response to the above continuation determination result, the display mode of the CID 22 is set to the restricted display mode DMr1 as illustrated in FIG. 17. As a result, the emergency vehicle notification MWq additionally displayed in the main display area DA1 and the back monitor video BM displayed in the sub display area DA2 notify the driver of the presence of the approaching emergency vehicle Qs. Also in the emergency vehicle approach pattern 7, the captured data of the camera unit 31 (e.g., left side) that includes the emergency vehicle Qs is automatically selected and displayed as the back monitor video BM.

Figure 18:
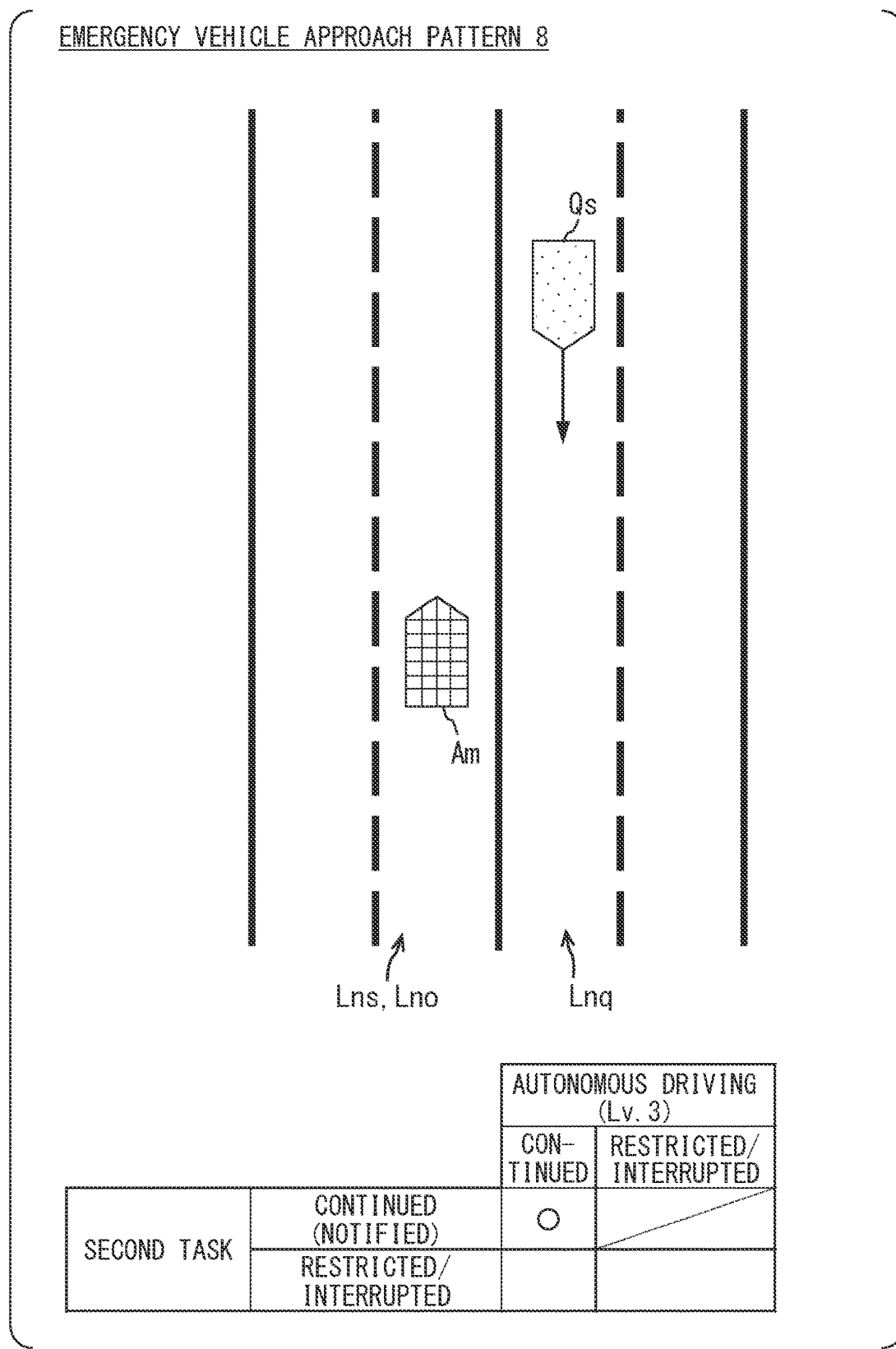
FIG. 18 is a view illustrating an example of a scene where an emergency vehicle traveling in an opposite lane is approaching from the front.

In an emergency vehicle approach pattern 8 illustrated in FIG. 18, the emergency vehicle Qs is approaching from the front of the subject vehicle (vehicle Am). That is, the subject vehicle lane Lns is the opposite lane Lno to the emergency vehicle lane Lnq. When recognizing that the emergency vehicle Qs is approaching from the front of the subject vehicle and the traveling direction of the emergency vehicle Qs is exactly opposite to the traveling direction of the subject vehicle, the action determination unit 62 allows both the level 3 autonomous driving and the permission state of the second task to be continued.

Figure 19:
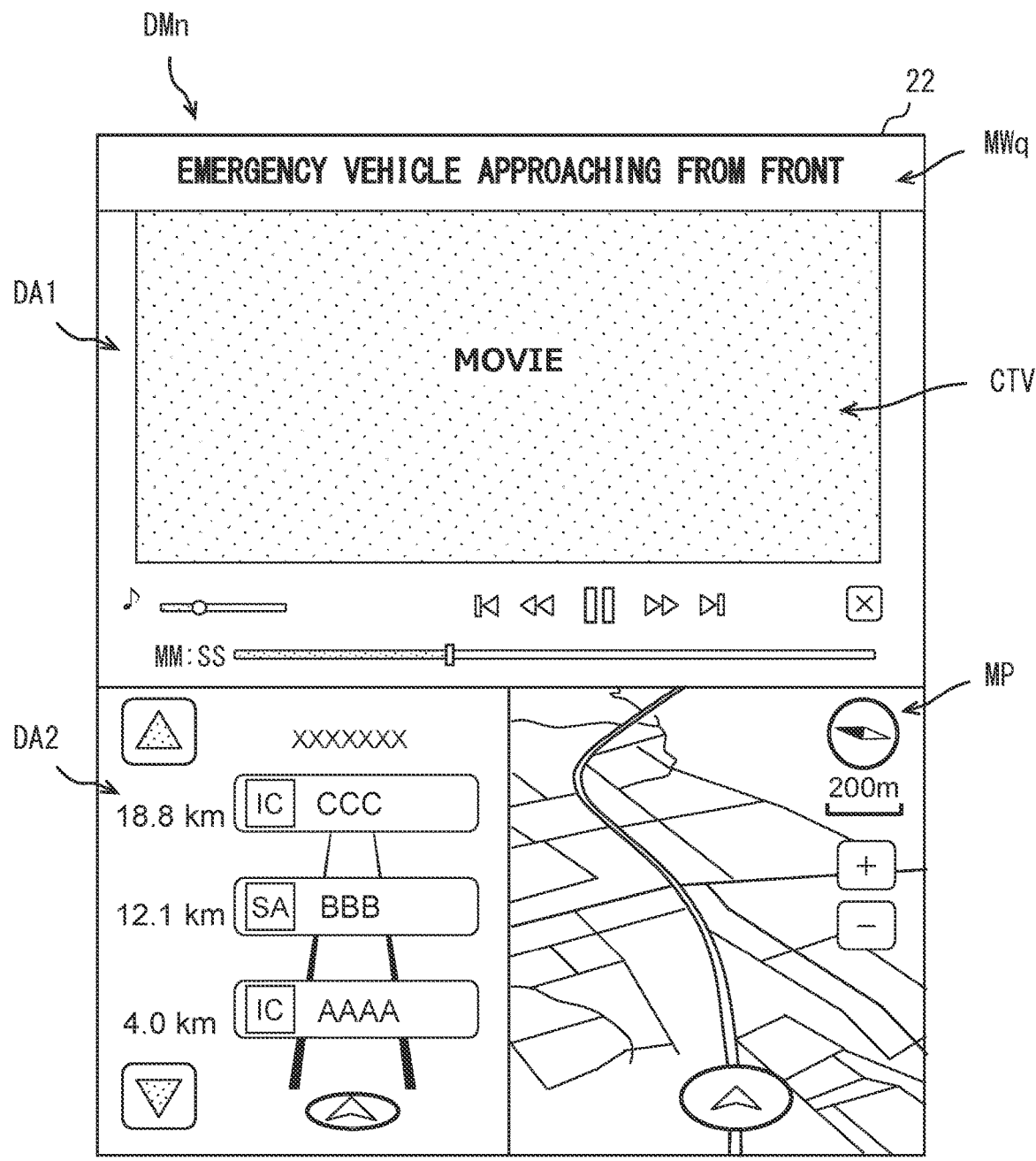
FIG. 19 is a view illustrating a display example of the CID in the scene illustrated in FIG. 18.

In response to the above continuation determination result, the display mode of the CID 22 is set to the second task mode DMn without restriction, as illustrated in FIG. 19. In this case, the emergency vehicle notification MWq is temporarily displayed so as to overlap a part of the video content CTV. The emergency vehicle notification MWq is displayed in a horizontally long belt shape in the vicinity of the upper edge of the main display area DA1, similarly to the restricted display mode DMr1. The emergency vehicle notification MWq includes, for example, a message such as "EMERGENCY VEHICLE IS APPROACHING FROM FRONT" so as to provide a notification of the presence of the emergency vehicle Qs traveling in the opposite lane. The display of the emergency vehicle notification MWq in a case where the emergency vehicle Qs is approaching from the front is ended after a predetermined time (e.g., about several seconds) elapses. Even in such short-time display, the driver can grasp the state outside the vehicle through the emergency vehicle notification MWq while continuing the watching of the video content CTV, in other words, without executing periphery monitoring. Therefore, the emergency vehicle notification MWq can give the driver a sense of security.

When the level 3 autonomous driving is temporarily restricted due to the approach of the emergency vehicle Qs in each of the scenes described above, the autonomous driving ECU 50*b* restarts the level 3 autonomous driving on the basis of an input of a return operation by the driver. In addition, the autonomous driving ECU 50*b* can automatically restart the level 3 autonomous driving on the basis of the recognition of the traveling environment around the subject vehicle by the environment recognition unit 61. Specifically, when the emergency vehicle Qs moves to the front of the vehicle, the autonomous driving ECU 50*b* raises the autonomous driving restricted, for example, to level 2 (in-lane traveling by an LTA function) to level 3. In addition, when the subject vehicle changes the lane from the emergency vehicle lane Lnq to the adjacent lane Lna, the autonomous driving ECU 50*b* restarts the level 3 autonomous driving after the subject vehicle returns to the original lane. Furthermore, when the situations of one or more preceding vehicles (another vehicle Ax) traveling in the diver's vehicle lane Lns are monitored, and when no change in lane of the preceding vehicle is detected for a certain period of time, the autonomous driving ECU 50b estimates that the behavior of the preceding vehicle becomes stable, and restarts the level 3 autonomous driving. As described above, the autonomous driving ECU 50b may automatically return the autonomous driving from manual driving to level 3, or may return the autonomous driving from level 1 or 2 to level 3.

Next, details of each processing to determine whether to continue by determining the emergency vehicle approach patterns described so far, and details of each processing to switch the display mode on the basis of the continuation determination result and the cancellation determination result, will be described below on the basis of FIGS. 20 to 23 and with reference to FIGS. 3 to 19.

Figure 20:
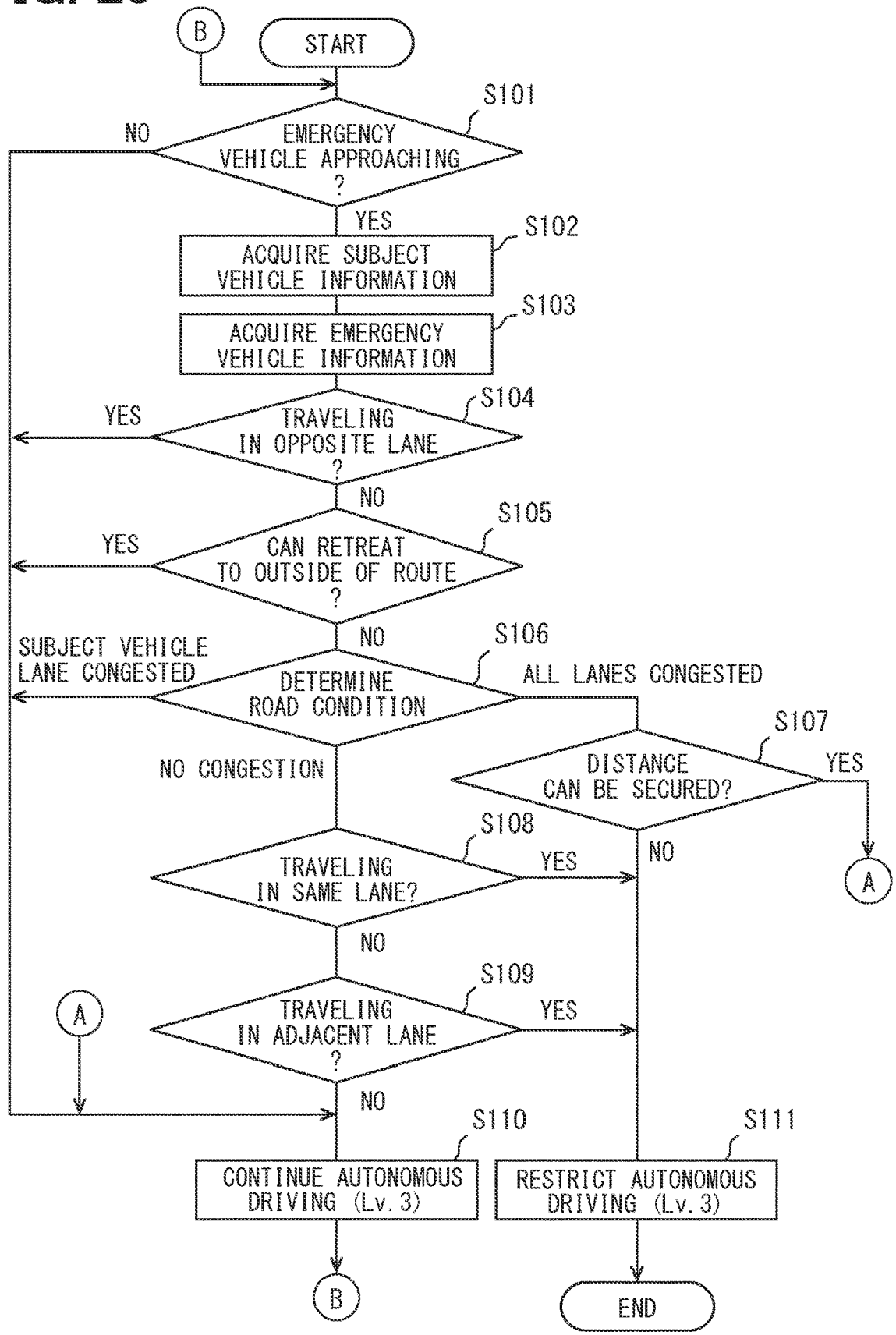
FIG. 20 is a flowchart illustrating details of continuation determination processing to determine whether to continue level 3 autonomous driving in a scene where an emergency vehicle is approaching.

The continuation determination processing for autonomous driving illustrated in FIG. 20 is started by the autonomous driving ECU 50b on the basis of the start of the level 3 autonomous cruising period. The autonomous driving ECU 50b continues the continuation determination processing for autonomous driving until the level 3 autonomous driving is restricted.

In S101, it is determined whether the emergency vehicle Qs is approaching the subject vehicle. When it is determined in S101 that the emergency vehicle Qs is not approaching, the processing proceeds to S110, where it is determined to continue the level 3 autonomous driving, and the process returns to S101. On the other hand, when it is determined in S101 that the emergency vehicle Qs is approaching, the processing proceeds to S102. In S102, the latest subject vehicle information related to the subject vehicle, such as the locator information, the vehicle speed information, and the recognition information around the subject vehicle, are acquired, and the processing proceeds to S103. In S103, the emergency vehicle information is acquired, and the processing proceeds to S104.

In S104, the positional relationship between the emergency vehicle Qs and the subject vehicle is grasped, and it is determined whether the subject vehicle is traveling in the opposite lane Lno to the emergency vehicle lane Lnq. When it is determined in S104 that the subject vehicle is traveling in the opposite lane Lno as in the above "emergency vehicle approach pattern 8 (see FIG. 18)" and that the emergency vehicle Qs traveling in the opposite lane is approaching from the front of the subject vehicle, the processing proceeds to S110, where it is determined to continue the autonomous driving. On the other hand, when it is determined in S104 that the emergency vehicle Qs is approaching from behind the subject vehicle, the processing proceeds to S105.

In S105, it is determined whether the subject vehicle can retreat to the outside of the scheduled traveling route for the emergency vehicle Qs. In S105, it is determined whether a scheduled traveling line for the subject vehicle can be deviated from the scheduled traveling route for the emergency vehicle Qs on the basis of the scheduled traveling route acquired in S103. When the scheduled traveling line for the subject vehicle cannot be deviated from the scheduled traveling route for the emergency vehicle Qs, it is determined in S105 that retreat to the outside of the scheduled traveling route is impossible, and the processing proceeds to S106.

On the other hand, when the subject vehicle can retreat from the scheduled traveling route for the emergency vehicle Qs as in the above "emergency vehicle approach pattern 7 (see FIG. 16)", the processing proceeds to S110, where it is determined to continue the autonomous driving. When the subject vehicle can retreat to the outside of the scheduled traveling route for the emergency vehicle Qs by turning right/left or the like at, for example, an intersection or the like, even when the subject vehicle retreats to the outside of the scheduled traveling route for the emergency vehicle Qs by the emergency vehicle Qs turning right/left or the like, or the like, the processing proceeds from S105 to S110. According to the continuation determination in S110, the operation execution unit 63 executes retreat traveling to the outside of the scheduled traveling route in accordance with the scheduled traveling line generated by the action determination unit 62.

In S106, the road condition around the subject vehicle is determined. When it is determined in S106 that the subject vehicle is traveling in congestion and all the lanes are congested as, for example, in the "emergency vehicle approach pattern 5 (see FIG. 14)", the processing proceeds to S107.

In S107, it is determined whether the distance from the subject vehicle to the emergency vehicle Qs is secured. In S107, when it is determined that the emergency vehicle Qs trying to travel, for example, on the roadside strip RST is approaching right behind or the right side of the subject vehicle, in other words, when it is determined that the subject vehicle and the emergency vehicle Qs are adjacent to each other on the road, it is determined that the distance is not secured, and the processing proceeds to S111. In S111, it is determined that the level 3 autonomous driving is to be restricted, and a series of the continuation determination processing is ended. On the other hand, when it is determined in S107 that the subject vehicle and the emergency vehicle Qs are not adjacent on the road and the distance to the emergency vehicle Qs is secured, the processing proceeds to S110, where it is determined to continue the autonomous driving.

When it is determined in S106 that there is the non-congested lane Lnp through which the emergency vehicle Qs can pass while the subject vehicle lane Lns is congested as, for example, in the "emergency vehicle approach pattern 6 (see FIG. 15)", the processing proceeds to S110, where it is determined to continue the autonomous driving. On the other hand, when it is determined in S106 that the periphery of the subject vehicle is not congested (non-congestion determination), the processing proceeds to S108.

In S108, the positional relationship between the emergency vehicle lane Lnq and the subject vehicle is determined. When it is determined in S108 that the subject vehicle and the emergency vehicle Qs are traveling in the same lane as, for example, in the "emergency vehicle approach pattern 4 (see FIG. 13)", the processing proceeds to S111, where it is determined to restrict the level 3 autonomous driving, and a series of the continuation determination processing is ended.

On the other hand, when it is determined in S108 that the subject vehicle is not traveling in the emergency vehicle lane Lnq, the processing proceeds to S109. In S109, the positional relationship between the adjacent lane Lna and the subject vehicle is determined. When it is determined in S109 that the subject vehicle is traveling in the separate lane Lnz as, for example, in the "emergency vehicle approach pattern 3 (see FIG. 12)", the processing proceeds to S110, where it is determined to continue the autonomous driving.

Note that, in a case where it is set to continue the autonomous driving even when the subject vehicle is traveling in the adjacent lane Lna as, for example, in the "emergency vehicle approach pattern 1 (see FIG. 8)", S109 may be omitted. In this case, it is determined in S110 that the autonomous driving is continued unless the subject vehicle and the emergency vehicle Qs are located in the same lane.

On the other hand, when it is determined in S109 that the subject vehicle is traveling in the adjacent lane Lna as, for example, in the "emergency vehicle approach pattern 2 (see FIG. 11)", the processing proceeds to S111, where it is determined to restrict the level 3 autonomous driving, and a series of the continuation determination processing is ended.

Figure 21:
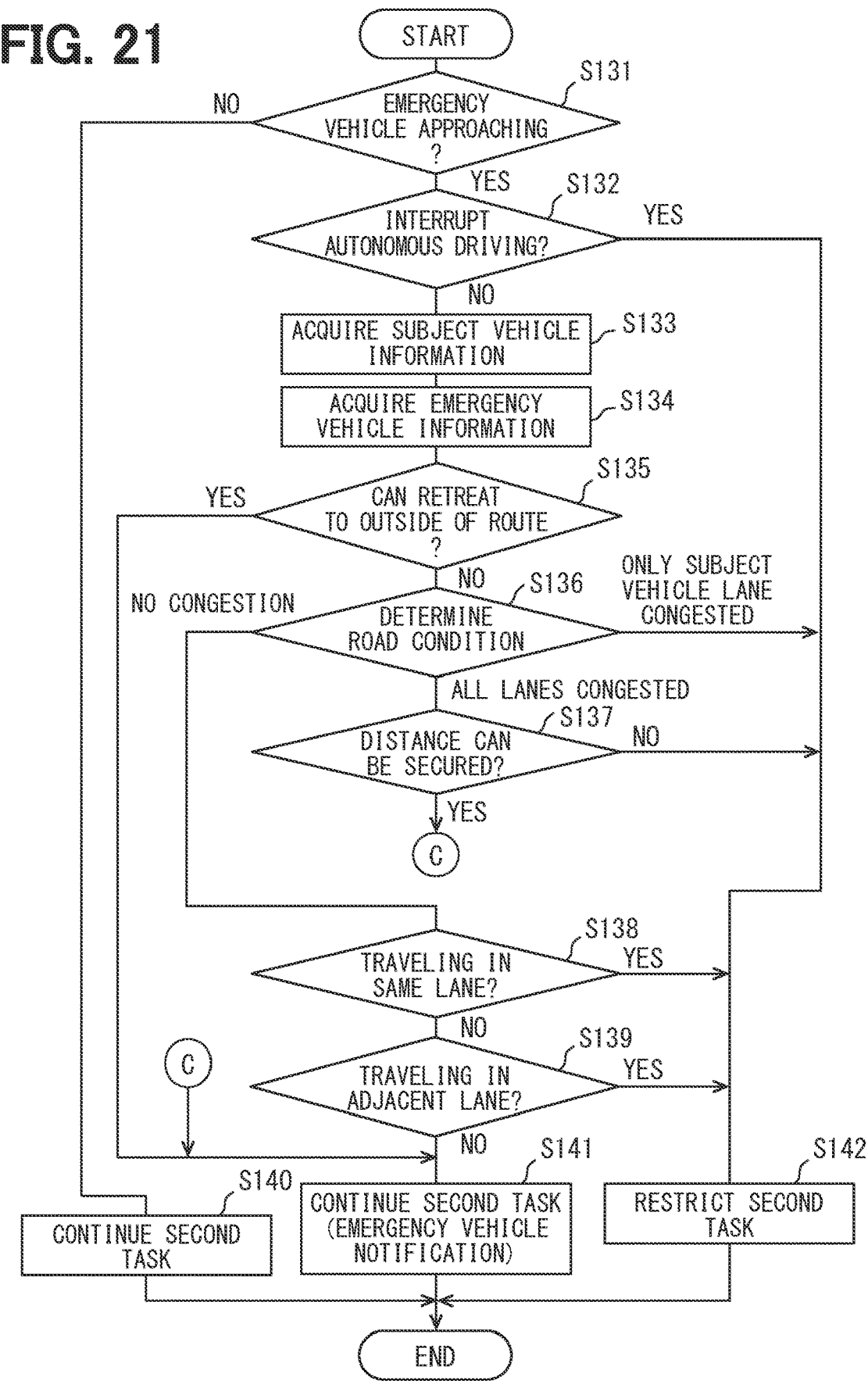
FIG. 21 is a flowchart illustrating details of continuation determination processing to determine whether to continue a second task in a scene where an emergency vehicle is approaching.

The continuation determination processing for the second task illustrated in FIG. 21 is started by the autonomous driving ECU 50b on the basis of the start of the autonomous cruising period, similarly to the continuation determination processing for the autonomous driving. The autonomous driving ECU 50b repeatedly starts the continuation determination processing for the second task in parallel with the continuation determination processing for the autonomous driving until the level 3 autonomous driving is restricted.

In S131, it is determined whether the emergency vehicle Qs is approaching the subject vehicle. In S131, it is further determined whether the emergency vehicle Qs is approaching from behind the subject vehicle. When it is determined in S131 that the emergency vehicle Qs is approaching from behind, the processing proceeds to S132. On the other hand, when it is determined in S131 that the emergency vehicle Qs is not approaching, or when it is determined that the emergency vehicle Qs is approaching from the front of the subject vehicle, the processing proceeds to S140.

In S140, it is determined to continue the permission state of the second task, and the continuation determination processing is once ended. In this case, the action determination unit 62 generates a continuation determination result including, together with a notification indicating that the continuation of the autonomous driving and the second task is permitted, a notification indicating that the emergency vehicle Qs is not approaching or a notification indicating that the emergency vehicle Qs is approaching from the front, and outputs the continuation determination result to the HCU 100.

In S132, it is determined whether the level 3 autonomous driving has been canceled by the continuation determination processing for the autonomous driving or the like. When it is determined in S132 that the level 3 autonomous driving is continued, the processing proceeds to S133. On the other hand, when it is determined in S132 that the level 3 autonomous driving has been interrupted (canceled), the processing proceeds to S142. In S142, it is determined to restrict (interrupt) the second task, and the continuation determination process is ended. In this case, the action determination unit 62 generates a continuation determination result including, together with a notification indicating that the emergency vehicle Qs is approaching from behind, a notification ordering interruption of the autonomous driving and the second task, and outputs the continuation determination result to the HCU 100.

In S133, the latest subject vehicle information related to the subject vehicle is acquired, and the processing proceeds to S134. In S134, the emergency vehicle information is acquired, and the processing proceeds to S135. In S135, it is determined whether the subject vehicle can retreat to the outside of the scheduled traveling route for the emergency vehicle Qs. When it is determined in S135 that the subject vehicle can retreat from the scheduled traveling route for the emergency vehicle Qs (see FIG. 16), the processing proceeds to S141. In S141, it is determined to continue the permission state of the second task, and the continuation determination processing is once ended. In this case, the action determination unit 62 generates a continuation determination result including, together with a notification indicating that the emergency vehicle Qs is approaching, a notification indicating permission to continue the autonomous driving and the second task, and outputs the continuation determination result to the HCU 100.

On the other hand, when it is determined in S135 that the subject vehicle cannot retreat from the scheduled traveling route for the emergency vehicle Qs, the processing proceeds to S136. In S136, a road condition around the subject vehicle is determined. When it is determined in S136 that the subject vehicle is traveling in congestion and all the lanes are congested (see FIG. 14), the processing proceeds to S137.

In S137, it is determined whether the distance from the subject vehicle to the emergency vehicle Qs is secured. When it is determined in S137 that the emergency vehicle Qs is approaching to close range of the subject vehicle, the processing proceeds to S142, where it is determined to restrict the second task, and the continuation determination processing is once ended. On the other hand, when it is determined in S137 that the distance to the emergency vehicle Qs is secured, the processing proceeds to S141, where it is determined to continue the second task, and the continuation determination processing is once ended.

When it is determined in S136 that there is the non-congested lane Lnp through which the emergency vehicle Qs can pass while the subject vehicle lane Lns is congested (see FIG. 15), the processing proceeds to S142, where it is determined to restrict the second task. On the other hand, when the non-congestion determination on the periphery of the subject vehicle is performed in S136, the processing proceeds to S138.

In S138, the positional relationship between the emergency vehicle lane Lnq and the subject vehicle is determined. When it is determined in S138 that the subject vehicle and the emergency vehicle Qs are traveling in the same lane (see FIG. 13), the processing proceeds to S142, where it is determined to interrupt the second task, and the continuation determination processing is once ended. On the other hand, when it is determined in S138 that the subject vehicle is not traveling in the emergency vehicle lane Lnq, the processing proceeds to S139.

In S139, the positional relationship between the adjacent lane Lna and the subject vehicle is determined. When it is determined in S139 that the subject vehicle is traveling in the separate lane Lnz (see FIG. 12), the processing proceeds to S141, where it is determined to continue the permission state of the second task, and the continuation determination processing is once ended. On the other hand, when it is determined in S139 that the subject vehicle is traveling in the adjacent lane Lna (see FIGS. 8 and 11), the processing proceeds to S142, where it is determined to interrupt the second task, and the continuation determination processing is once ended.

Figure 22:
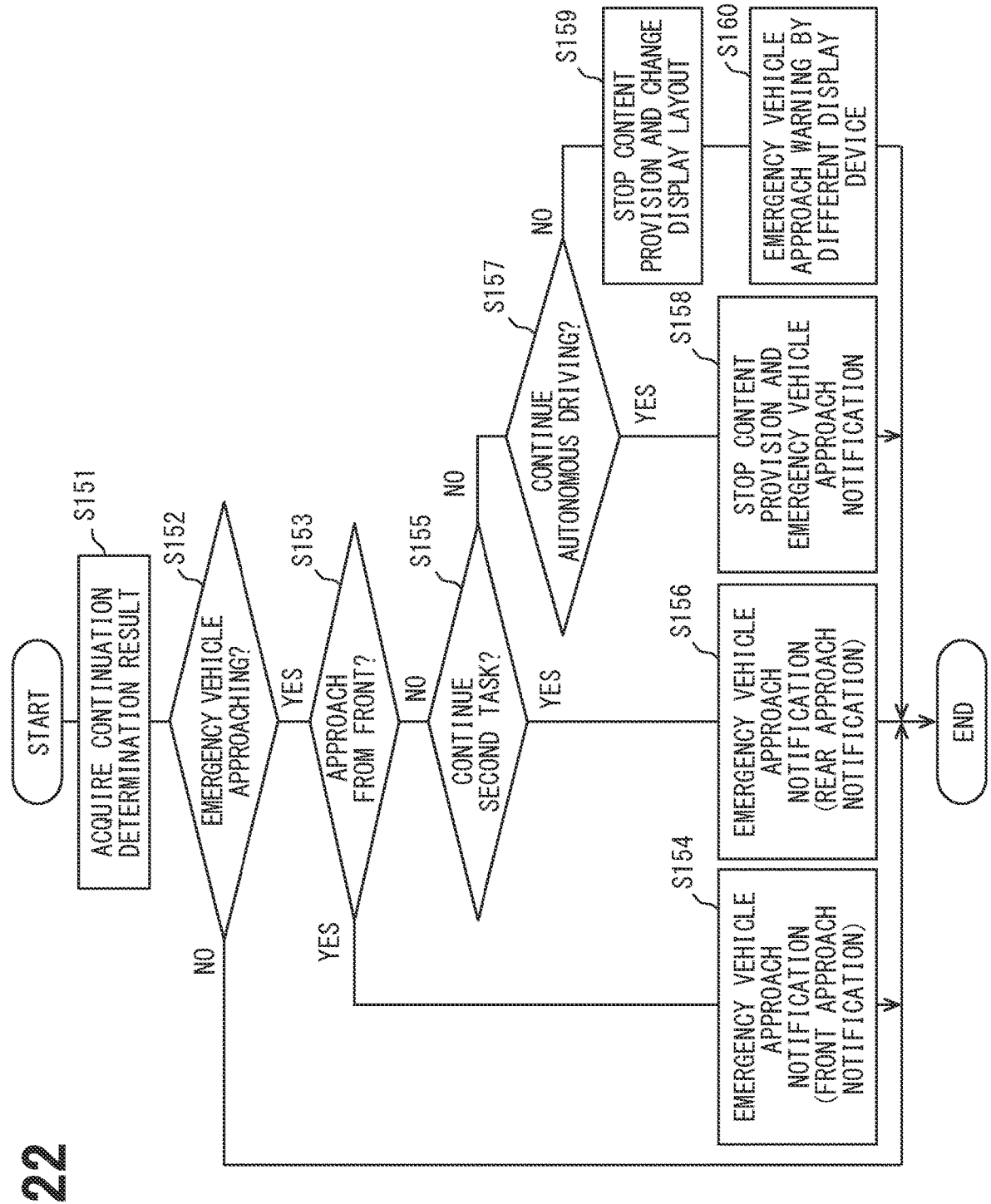
FIG. 22 is a flowchart illustrating details of display control processing to switch a display mode of the CID on the basis of the determination on whether to continue the autonomous driving and the second task.

The display control processing illustrated in FIG. 22 is started by the HCU 100 on the basis of the start of display of an entertainment content such as the video content CTV. The HCU 100 repeatedly starts the display control processing until the second task is interrupted or an operation to end the video content CTV is input by the driver.

In S151, the continuation determination result provided by the autonomous driving ECU 50b is acquired, and the processing proceeds to S152. In S152, the presence/absence of a notification indicating the approach of the emergency vehicle Qs is determined with reference to the continuation determination result acquired in S151. When it is determined in S152 that there is no notification indicating the approach of the emergency vehicle Qs, the display control processing is once ended. On the other hand, when it is determined in S152 that there is a notification indicating the approach of the emergency vehicle Qs, the processing proceeds to S153.

In S153, the presence/absence of a notification indicating the approach of the emergency vehicle Qs from the front of the subject vehicle is determined with reference to the continuation determination result acquired in S151. When it is determined in S153 that the emergency vehicle Qs is approaching from the front of the subject vehicle, the processing proceeds to S154. In S154, the emergency vehicle notification MWq is temporarily additionally displayed in the main display area DA1 in the normal second task mode DMn (see FIG. 19), and the driver is notified of the approach of the emergency vehicle Qs from the front. In S154, the emergency vehicle notification MWq is ended on the basis that a predetermined time elapses, and the display control processing is once ended.

On the other hand, when it is determined in S153 that the emergency vehicle Qs is approaching from behind the subject vehicle, the processing proceeds to S155. In S155, it is determined whether to continue the state in which the second task is permitted to the driver, with reference to the continuation determination result acquired in S151. When it is determined in S155 that the permission state of the second task is continued, the processing proceeds to S156. In S156, the driver is notified of the approach of the emergency vehicle Qs by additional display of the emergency vehicle notification MWq by switching to the restricted display mode DMr1 (see FIG. 5), and the display control processing is once ended.

On the other hand, when it is determined in S155 that the permission state of the second task is not continued, the processing proceeds to S157. In S157, it is further determined whether the level 3 autonomous driving is continued, with reference to the continuation determination result acquired in S151. When it is determined in S157 that the autonomous driving is continued, the processing proceeds to S158. In S158, the provision of the video content CTV is ended by switching to the restricted display mode DMr2 (see FIG. 6). In addition, in S158, the driver is notified of the approach of the emergency vehicle Qs by the additional display of the emergency vehicle notification MWq, and the display control processing is once ended.

On the other hand, when it is determined in S157 that the autonomous driving is not continued, the processing proceeds to S159. In S159, the provision of the video content CTV is ended by switching to the restricted display mode DMr3 (see FIG. 7), a change in display layout in which the contents in the main display area DA1 and the sub display area DA2 are exchanged is executed, and the processing proceeds to S160. In S160, the emergency vehicle warning MWa is displayed on a different display, for example, at least one of the meter display 21 and the HUD 23 to warn the driver of the approach of the emergency vehicle Qs, and the display control processing is once ended.

Figure 23:
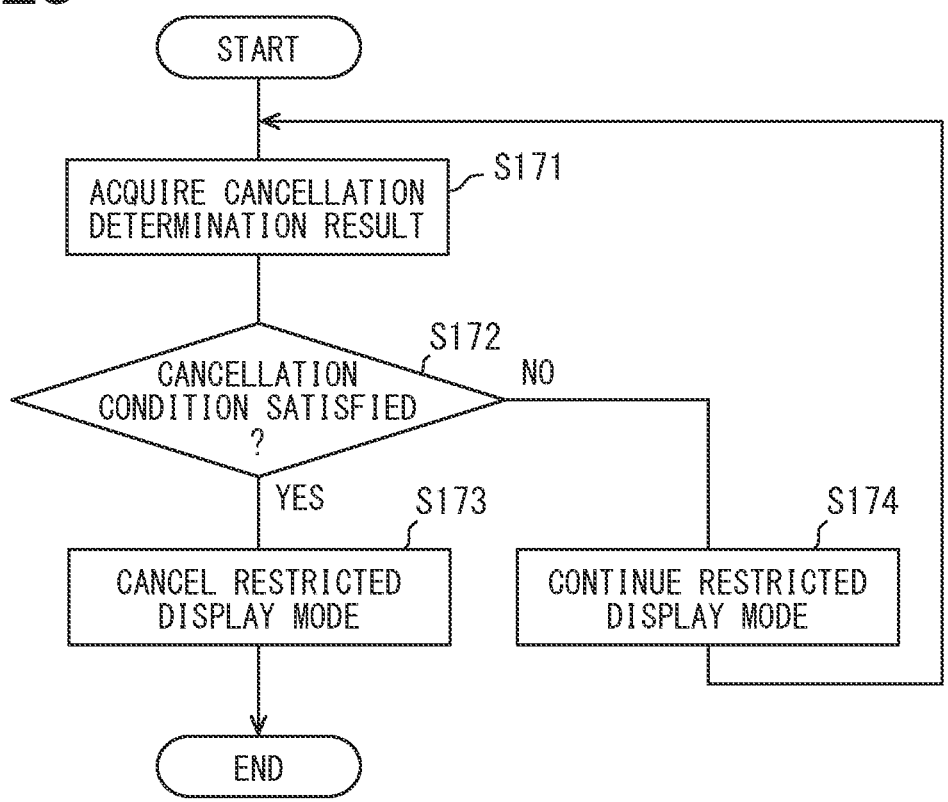
FIG. 23 is a flowchart illustrating details of display control processing to return the display mode of the CID to a state before the switching.

The display control processing illustrated in FIG. 23 is started by the HCU 100 on the basis of switching of the display mode to the restricted display modes DMr1 to DMr3.

In S171, the cancellation determination result provided by the autonomous driving ECU 50b is acquired, and the processing proceeds to S172. In S172, it is determined whether a cancellation condition for permitting cancellation of the restriction on the display of the video content CTV is satisfied with reference to the cancellation determination result acquired in S171. When it is determined in S172 that at least one of the preset cancellation conditions is satisfied, the processing proceeds to S173. In S173, the cancellation of the restricted display modes DMr1 to DMr3 is permitted, and the display control processing is ended. In this case, the display mode is switched from each of the restricted display modes DMr1 to DMr3 to the normal second task mode DMn automatically or on the basis of a user operation. On the other hand, when it is determined in S172 that the cancellation condition is not satisfied, continuation of the restricted display modes DMr1 to DMr3 is determined in S174, and the process returns to S171. As described above, the restriction on the display of the video content CTV is continued until the specific cancellation condition is satisfied.

When determining that the permission state of the second task is not continued due to the approach of the emergency vehicle Qs to the subject vehicle while the driver is performing the second task, the HCU 100 of the first embodiment described above restricts the display of the video content CTV. Therefore, even during the execution of the second task, the driver can easily notice the approach of the emergency vehicle Qs because the display of the video content CTV is restricted. According to the above, even if the emergency vehicle Qs approaches during the level 3 autonomous cruising, it is possible to make it difficult to cause anxiety to the driver.

In addition, when the display of the video content CTV is restricted, the provision control unit 74 of the first embodiment continues the restriction on the display of the video content CTV until at least one cancellation condition is satisfied. Therefore, the driver can appropriately pay attention to the emergency vehicle Qs without being disturbed by the continuation of the provision of the video content CTV.

In addition, the provision control unit 74 of the first embodiment sets the elapse of a predetermined time after the emergency vehicle Qs overtakes the subject vehicle as the cancellation condition, and continues the restriction on the display of the content until the predetermined time elapses. According to the above, the restriction on the display of the video content CTV is not canceled during a period when a change in behavior caused by the emergency vehicle Qs is likely to occur. Therefore, it is possible to avoid a situation in which the driver feels anxious due to the early restart of the second task.

Furthermore, the provision control unit 74 of the first embodiment sets the fact that the emergency vehicle Qs that overtook the subject vehicle is separated by the separation distance DSq or more as the cancellation condition, and continues the restriction on the display of the video content CTV until the emergency vehicle Qs is separated by the separation distance DSq or more. Even with such restriction on display, the restriction on the display of the video content CTV is not canceled during a period when a change in behavior caused by the emergency vehicle Qs is likely to occur. Therefore, it is possible to avoid a situation in which the driver feels anxious due to the early restart of the second task.

In addition, the provision control unit 74 of the first embodiment sets the fact that the behavior of the another vehicle Ax traveling around the subject vehicle becomes stable as the cancellation condition, and continues the restriction on the display of the video content CTV until the behavior of the another vehicle Ax becomes stable. According to the above, the restriction on the display of the video content CTV is not canceled during a period when a change in behavior caused by the behavior of the another vehicle Ax is likely to occur. Therefore, it is possible to avoid a situation in which the driver feels anxious due to the early restart of the second task.

In addition, the provision control unit 74 of the first embodiment sets the fact that after the emergency vehicle Qs overtook the subject vehicle, the subject vehicle overtakes the emergency vehicle Qs again as the cancellation condition, and continues the restriction on the display of the content until the subject vehicle overtakes the emergency vehicle Qs again. According to the setting of such cancellation condition, the restriction on the display can be canceled after the driver is allowed to confirm the stop of the emergency vehicle Qs, in a scene where the emergency vehicle Qs stops at the site of a failure or an accident, or the like. As a result, the driver can restart the second task with a sense of security.

Furthermore, in the first embodiment, a notification of the approach of the emergency vehicle Qs is provided even when the emergency vehicle Qs traveling in the opposite lane is approaching from the front of the subject vehicle. According to such a notification, the driver can grasp a state outside the vehicle in which the emergency vehicle Qs is approaching, while continuing the second task. As a result, the sense of security of the driver can be enhanced.

In addition, when the autonomous driving ECU 50b detects that the emergency vehicle Qs is approaching the subject vehicle, the task continuation determination unit 72 of the first embodiment further determines whether the level 3 autonomous driving is continued on the basis of the continuation determination result acquired from the autonomous driving ECU 50b. When it is determined that the autonomous driving is not continued (see FIG. 7), the display of the video content CTV is more restricted than when it is determined that the autonomous driving is continued (see FIG. 6). According to the restriction on display that strongly restricts the display of the video content CTV when the autonomous driving is restricted, the driver can be strongly urged to voluntarily execute periphery monitoring, as described above. As a result, it is possible to provide the video content CTV that does not interfere with the driver dealing with the driving operation takeover request from the autonomous driving system 50.

In addition, when determining that the emergency vehicle Qs is approaching the subject vehicle, the autonomous driving ECU 50b of the first embodiment determines whether to continue the level 3 autonomous driving and whether to continue the permission state of the second task. Therefore, even during the execution of the second task, the driver can easily notice the approach of the emergency vehicle Qs because the level 3 autonomous driving or the permission state of the second task is not continued. According to the above, even if the emergency vehicle Qs approaches during the autonomous cruising, it is possible to make it difficult to cause anxiety to the driver.

Furthermore, in the first embodiment, it is determined whether to continue the level 3 autonomous driving and the second task on the basis of the relative position of the emergency vehicle lane Lnq with respect to the subject vehicle. According to the above, the continuations of the autonomous driving and the second task can be appropriately restricted depending on a situation in which the emergency vehicle Qs is approaching. Therefore, convenience for the driver can be ensured while the driver is made not to feel anxious.

Specifically, when the subject vehicle travels in the adjacent lane Lna, as illustrated in the emergency vehicle approach pattern 1 (see FIG. 8) in the first embodiment, the continuation of the level 3 autonomous driving is permitted. On the other hand, the continuation of the second task is restricted. According to the above, the target of the driver's attention can smoothly transition from the second task to monitoring the periphery of the subject vehicle. As a result, the driver is less likely to feel anxious also about a change in behavior caused by, for example, the another vehicle Ax cutting into the front of the subject vehicle.

In addition, even when the continuation of the level 3 autonomous driving is permitted in the first embodiment, the traveling speed of the vehicle Am that is set for the autonomous driving is changed to be lower than that before the approach of the emergency vehicle Qs. According to such speed suppression control, the driver can grasp that travel control corresponding to the approach of the emergency vehicle Qs has been started. According to the above, the anxiety of the driver who has recognized the approach of the emergency vehicle Qs can be further reduced.

In addition, when the subject vehicle travels in the adjacent lane Lna, as illustrated in the emergency vehicle approach pattern 2 (see FIG. 11) in the first embodiment, the continuation of the level 3 autonomous driving is restricted. Then, the driver is notified of the presence of the emergency vehicle Qs. As described above, when the emergency vehicle Qs passes very close to the subject vehicle, the autonomous driving is ended to urge the driver to monitor the periphery, so that the effect of making it difficult to cause anxiety to the driver can be further exerted.

Furthermore, when the subject vehicle travels in the separate lane Lnz separated from the emergency vehicle lane Lnq, as illustrated in the emergency vehicle approach pattern 3 (see FIG. 12) in the first embodiment, the continuation of the second task is permitted. In a scene where the risk of occurrence of a sudden change in behavior is low, the continuation of the second task is permitted as described above, so that high convenience for the driver can be ensured. In addition, even when the continuation of the second task is permitted, the driver is notified of the presence of the emergency vehicle Qs. Therefore, even if a change in behavior occurs, the driver is less likely to feel anxious because the driver grasps the cause of the change in behavior.

In addition, when the subject vehicle travels in the emergency vehicle lane Lnq, as illustrated in the emergency vehicle approach pattern 4 (see FIG. 13) in the first embodiment, not only the continuation of the second task but also the continuation of the autonomous driving is restricted. According to the above, in a scene where the risk of occurrence of a sudden change in behavior is high, the authority of driving operation is taken over to the driver in advance, so that the anxiety of the driver can be reduced.

In addition, in the first embodiment, it is determined whether to continue the level 3 autonomous driving and the second task on the basis of the road condition around the subject vehicle. Therefore, the continuations of the autonomous driving and the second task can be appropriately restricted depending on the road condition. As a result, convenience for the driver can also be ensured while the driver is made not to feel anxious.

Specifically, when all lanes included in a road are congested as illustrated in the emergency vehicle approach pattern 5 (see FIG. 14) in the first embodiment, the continuation of the second task is permitted. In addition, the driver is notified of the approach of the emergency vehicle Qs by the additional display of the emergency vehicle notification MWq. According to the above, the driver can continue the watching of the video content CTV while recognizing the approach of the emergency vehicle Qs. As a result, convenience for the driver can be easily secured.

On the other hand, when the emergency vehicle Qs approaches very close to the subject vehicle, not only the second task but also the level 3 autonomous driving is restricted. According to the processing to quickly transfer the authority of driving operation to the driver, as described above, a flexible measure, such as giving a traveling space to the emergency vehicle Qs trying to travel, for example, on the roadside strip RST, can be executed by the driver.

In addition, when there is the non-congested lane Lnp on which the emergency vehicle Qs can travel even if the subject vehicle lane Lns is congested, as illustrated in the emergency vehicle approach pattern 6 (see FIG. 15) in the first embodiment, the continuation of the level 3 autonomous driving is permitted. Therefore, a driving load for the driver traveling in congestion can be reduced. On the other hand, the continuation of the second task is restricted. Therefore, the driver's attention is directed to the periphery of the subject vehicle. Therefore, the driver is also less likely to feel anxious about a change in behavior caused by a situation in which, for example, the another vehicle Ax cuts into the front of the subject vehicle.

In addition, when the scheduled traveling route for the emergency vehicle Qs can be grasped and the subject vehicle can retreat from the scheduled traveling route, as illustrated in the emergency vehicle approach pattern 7 (see FIG. 16) in the first embodiment, the continuation of the second task is permitted. According to the above, occurrence of excessive restriction on the second task is avoided, so that convenience for the driver can be easily ensured.

Note that, in the above embodiment, the environment recognition unit 61 corresponds to an "approach determination unit", the action determination unit 62 and the task continuation determination unit 72 each correspond to a "continuation determination unit", the integrated state estimation unit 73 corresponds to a "sleep estimation unit", and the provision control unit 74 corresponds to a "provision restriction unit". Furthermore, the autonomous driving ECU 50b and the HCU 100 each correspond to the "control device", the video content CTV corresponds to the "content", the second task corresponds to the "specific act other than driving", and the separation distance DSq corresponds to the "predetermined distance".

SECOND EMBODIMENT

In a second embodiment of the present disclosure, the autonomous driving ECU 50b illustrated in FIG. 3 can execute level 4 autonomous driving. During a level 4 autonomous driving period, the permission range control unit 69 permits the driver to take a posture with a seat belt removed and to perform an act such as sleep, in addition to the acts such as watching the video content CTV and operating a smartphone. When the emergency vehicle Qs approaches the subject vehicle traveling by the level 4 autonomous driving, the permission range control unit 69 determines whether to continue the state in which the driver is permitted to sleep. Note that the automation level control unit 68 allows in principle the level 4 autonomous driving to be continued even in a scene where the emergency vehicle Qs is approaching.

The permission range control unit 69 does not permit the continuation of the state in which sleep is permitted, in each of the emergency vehicle Qs approach scenes where the level 3 autonomous driving or the second task is restricted in the first embodiment. The permission range control unit 69 does not permit the driver to sleep in the emergency vehicle approach patterns 1, 2, and 4 to 6 of the first embodiment. On the other hand, in the emergency vehicle approach patterns 3, 7, 8, and the like of the first embodiment in which the execution of the second task is not restricted, the permission range control unit 69 permits the driver to continue the sleep. That is, when there is no another vehicle Ax around the subject vehicle and the emergency vehicle Qs is present in a different lane from the subject vehicle, the permission range control unit 69 permits the continuation of the sleep. In addition, the permission range control unit 69 permits the continuation of the sleep in substantially any situation as long as the emergency vehicle Qs is traveling in the opposite lane to the subject vehicle. A result of determining whether to continue sleep by the permission range control unit 69 is provided to the HCU 100, similarly to the continuation determination result, the cancellation determination result, and the like.

Figure 24:
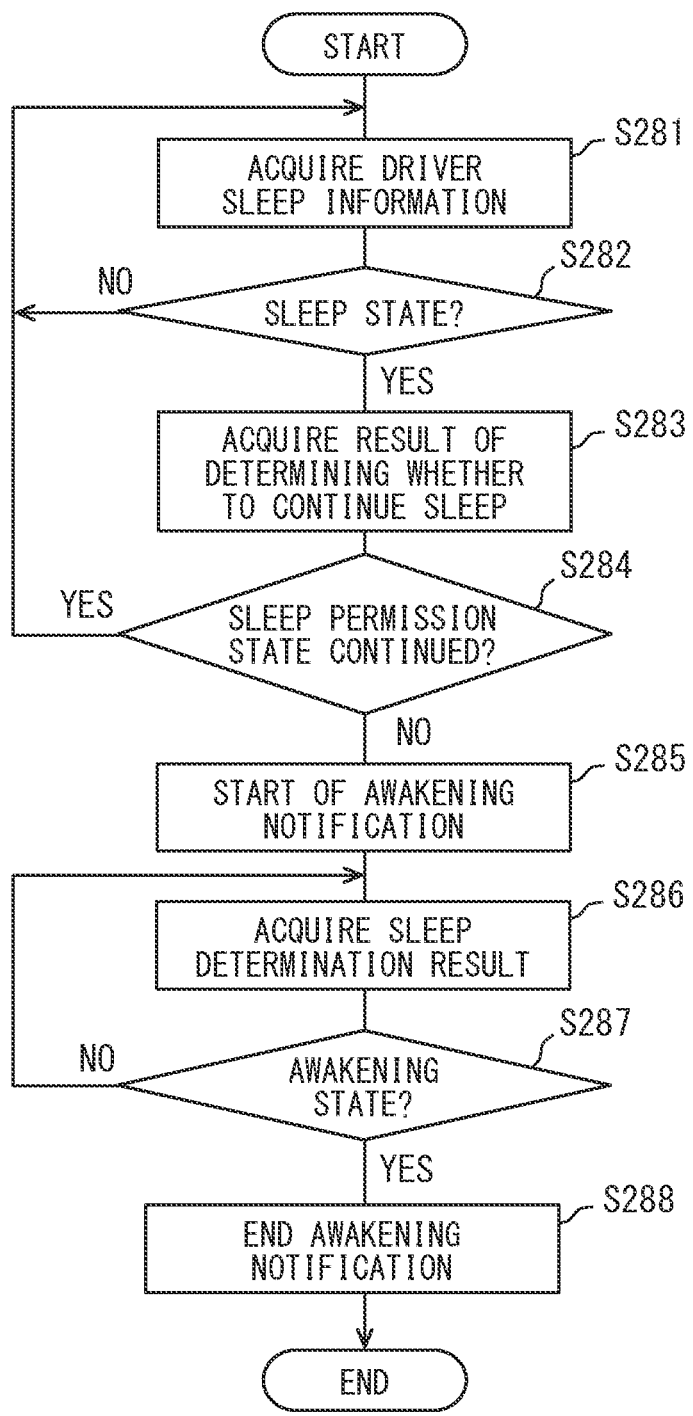
FIG. 24 is a flowchart illustrating details of sleep monitoring processing executed by an HCU of a second embodiment of the present disclosure.

The HCU 100 starts sleep monitoring processing (see FIG. 24) on the basis of the activation of the level 4 autonomous driving by the autonomous driving ECU 50b. The sleep monitoring processing is executed by the task continuation determination unit 72, the integrated state estimation unit 73, and the provision control unit 74. By the sleep monitoring processing, a notification (hereinafter, awakening notification) to urge awakening from a sleep state is executed as necessary.

The task continuation determination unit 72 acquires, through the information acquisition unit 71, the result of determining whether to continue sleep that is output from the autonomous driving ECU 50b (S283). The task continuation determination unit 72 refers to the result of determining whether to continue sleep, and determines whether the permission state, in which the driver is permitted to sleep, is continued in the future (S284).

The integrated state estimation unit 73 acquires, through the information acquisition unit 71, driver state information (hereinafter, driver sleep information) indicating whether the driver is in a sleep state from the driver monitor 29 (S281 and S286). The driver sleep information may be information indicating whether the driver is in a sleep state in a binary manner, or may be information indicating the sleep state of the driver in multiple stages, scores, or the like. The integrated state estimation unit 73 refers to the driver sleep information and estimates whether the driver is in a sleep state or an awake state (S282 and S287).

When the integrated state estimation unit 73 determines that the driver is in a sleep state (S282: YES) and the task continuation determination unit 72 determines that the permission state of the sleep is not continued (S284: NO), the provision control unit 74 executes an awakening notification (S285). The awakening notification is an actuation in which a message voice is mainly reproduced by, for example, the audio device 24. The provision control unit 74 may further execute an operation of raising the backrest of the driver's seat, or the like as the awakening notification. When the integrated state estimation unit 73 determines that the driver is in an awake state (S287: YES) after the start of the awakening notification or when a timeout occurs thereafter (S288), the provision control unit 74 ends the awakening notification.

In a scene where the emergency vehicle Qs is approaching, the provision control unit 74 sets the start timing of the awakening notification during the execution of the level 4 autonomous driving to be earlier than the start timing of the restriction on the display during the execution of the level 3 autonomous driving. Specifically, when the driver is in a sleep state during the execution of the level 4 autonomous driving, a threshold for determining the approach of the emergency vehicle Qs is more relaxed than during the execution of the level 3 autonomous driving. As an example, when it is determined that the emergency vehicle Qs is approaching on the basis of a distance from the subject vehicle to the emergency vehicle Qs, the distance is set to be longer when the driver is in a sleep state than during the execution of the level 3 autonomous driving. Note that, when the driver is not in a sleep state, a threshold for determining whether the emergency vehicle Qs is approaching may be set to substantially the same timing between during the execution of the level 4 autonomous driving and during the execution of the level 3 autonomous driving.

Also in the second embodiment described above, the same effects as those of the first embodiment are exerted, and the anxiety of the driver during the execution of the level 4 autonomous driving can be reduced.

In addition, when it is determined, under a condition where the driver is estimated to be in a sleep state, that the permission state of sleep is not continued due to the approach of the emergency vehicle Qs in the second embodiment, an awakening notification to urge the driver to wake up is executed. As a result, the driver can watch how the autonomous driving ECU 50b deals with the emergency vehicle Qs in a somewhat awake state. Therefore, a situation in which a change in behavior in the vehicle Am, caused by the approach of the emergency vehicle Qs, is encountered in a sleep state is avoided.

In addition, the provision control unit 74 of the second embodiment executes an awakening notification to urge the driver in a sleep state to wake up at earlier timing than an approach notification (see FIG. 22, S156, etc.) to notify the driver, who is in an awake state during the execution of the level 3 autonomous driving, of the approach of the emergency vehicle Qs. According to such adjustment of the notification timing, a sufficient time can be secured during which the driver wakes up from the sleep state and grasps the approach of the emergency vehicle Qs. As a result, the sense of security of the driver can be enhanced.

Furthermore, when the subject vehicle travels in a different lane from the emergency vehicle lane Lnq and there is no another vehicle Ax around the subject vehicle in the second embodiment, the permission range control unit 69 allows the permission state of the sleep to be continued. As described above, in a scene where the possibility of requesting the driver to deal with the emergency vehicle Qs is very low, the state in which the driver is permitted to sleep may be continued. With such an awakening notification omitted, the convenience of the level 4 autonomous driving is further improved. Note that, in the second embodiment, the integrated state estimation unit 73 corresponds to a "sleep determination unit".

OTHER EMBODIMENTS

Although a plurality of embodiments of the present disclosure have been described above, the present disclosure is not to be construed as being limited to the above embodiments, and can be applied to various embodiments and combinations without departing from the gist of the present disclosure.

In a first modification of the above embodiments, a result of determining whether to continue the second task is output from the autonomous driving ECU 50b to the HCU 100. When the task continuation determination unit 72 determines that the permission state of the second task is not continued, the provision control unit 74 interrupts the display of the video content CTV. In the first modification, the provision control unit 74 sets to the restricted display mode DMr3 and ends the second task being executed by the driver, regardless of whether the level 3 autonomous driving is continued. As in the first modification described above, only one display mode for interrupting the reproduction of the entertainment content may be prepared. Alternatively, three or more display modes for interrupting the reproduction of the entertainment content may be prepared.

In a second modification of the above embodiments, the positional relationship between the emergency vehicle lane Lnq and the subject vehicle is used for determining whether to continue the level 3 autonomous driving and the second task, but the road condition around the subject vehicle is not used. On the other hand, in a third modification of the above embodiments, the road condition around the subject vehicle is used for determining whether to continue the autonomous driving and the second task, but the positional relationship between the emergency vehicle lane Lnq and the subject vehicle is not used.

In a fourth modification of the above embodiments, the timing, at which a notification of the approach of the emergency vehicle Qs is provided, is changed depending on whether the subject vehicle is traveling in congestion. The timing, at which the notification of the approach of the emergency vehicle Qs is provided, is considered to be a timing when a time (e.g., about 13 seconds), during which the driver deals with the take over request from the autonomous driving system 50, can be secured. Therefore, when the subject vehicle travels in congestion, the provision control unit 74 delays the timing, at which the notification of the approach of the emergency vehicle Qs is provided, more than normal.

Furthermore, the provision control unit 74 may change the timing, at which the notification of the approach of the emergency vehicle Qs is provided, depending on an acquisition route for the emergency vehicle information. As an example, when determining the approach of the emergency vehicle Qs from the detected information of the periphery monitoring sensor 30, the provision control unit 74 immediately notifies the driver of the approach of the emergency vehicle Qs. On the other hand, when determining the approach of the emergency vehicle Qs on the basis of the acquired information through the road-to-vehicle communication, the provision control unit 74 notifies the driver of the approach of the emergency vehicle Qs at a timing at which the distance from the emergency vehicle Qs to the subject vehicle becomes less than a predetermined distance (e.g., about 1 km).

In a fifth modification of the above embodiments, a text message other than the specified one is displayed in the emergency vehicle notification MWq and the emergency vehicle warning MWa. More specifically, the emergency vehicle detection unit 65 can recognize a voice emitted from the emergency vehicle Qs and provide its character data to the HCU 100. The provision control unit 74 allows a message sentence based on the acquired character data to be displayed in the emergency vehicle notification MWq and the emergency vehicle warning MWa.

In the above embodiments, the display of the content is restricted by the processing to pause the reproduction of the video content CTV. However, the method of restricting the display of the content can be appropriately changed. As an example, in a sixth modification of the above embodiments, display processing to gray down the video content CTV is performed, in the restricted display mode DMr2, as the restriction on the display of the content. In a seventh modification of the above embodiments, a window including a warning message is superimposed to cover the display center of the video content CTV in at least one of the restricted display mode DMr2 and the restricted display mode DMr3.

A combination of the conditions for canceling the restriction on the display set in the first embodiment may be appropriately changed. For example, when at least one of the four cancellation conditions described above is satisfied, the restriction on the display of the video content CTV may be canceled. In addition, some of the cancellation conditions may be omitted. As an example, in an eighth modification of the above embodiments, the restriction on the display is canceled when the predetermined time elapses and the separation distance DSq is secured or when the subject vehicle overtakes the emergency vehicle Qs. Furthermore, in a ninth modification of the above embodiments, the restriction on the display is canceled when the behavior of the another vehicle Ax around the subject vehicle becomes stable, regardless of the elapsed time after the overtaking and the distance to the emergency vehicle Qs.

In a tenth modification of the second embodiment, the awakening notification when the driver is in a sleep state is executed at substantially the same timing as the notification of the approach of the emergency vehicle Qs. In this case, the notification of the approach of the emergency vehicle Qs may also serve as the awakening notification. In an eleventh modification of the second embodiment, the continuation of sleep is not permitted when the emergency vehicle Qs is approaching from behind the subject vehicle, regardless of the position of the subject vehicle lane and the presence or absence of the another vehicle Ax. Furthermore, in a twelfth modification of the above embodiments, the notification of the emergency vehicle Qs approaching from the front of the subject vehicle is omitted.

The display device that displays contents related to the second task is not limited to the CID 22. For example, the meter display 21 and the HUD 23 may be used for providing entertainment contents. Furthermore, the displays EMB, EML, EMR of the electronic mirror system may be used for providing contents. In addition, the display device that displays a content may be selectable by the driver.

In addition, the shape, luminous color, display position, and the like of each image displayed on each display device may be appropriately changed. In addition, the type of language of a message displayed on each display device may be appropriately changed on the basis of user setting by the driver or the like, and settings of the country, region, and others where the vehicle Am is used. Similarly, the type of language of a voice message reproduced by the audio device 24 may also be appropriately changed.

The second task permitted to the driver is not limited to the above acts, and may be appropriately changed in accordance with laws and regulations such as the Road traffic law of the country and region where the vehicle Am is used.

In a thirteenth modification of the above embodiments, any one of the meter display 21, the CID 22, and the HUD 23 is integrally configured with the HCU 100. In other words, the processing function of the HCU 100 is implemented in the control circuit of any one of the display devices. In such a thirteenth modification, a display device including the processing function of the HCU 100 corresponds to the "control device".

The autonomous driving system 50 of the above embodiments is provided with two in-vehicle ECUs of the driving assistance ECU 50a and the autonomous driving ECU 50b. However, one in-vehicle ECU having the respective functions of the driving assistance ECU 50a and the autonomous driving ECU 50b may constitute the autonomous driving system 50. Furthermore, the respective functions of the autonomous driving ECU 50b and the HCU 100 of the above embodiments may be implemented in one in-vehicle ECU.

In the above embodiments and modifications, the respective functions provided by the autonomous driving ECU 50b and the HCU 100 can be also provided by software and hardware for executing the software, only software, only hardware, and complex combinations of software and hardware. In cases where functions are provided by electronic circuits as hardware, the functions can be also provided by analog circuits or digital circuits which include a large number of logic circuits.

The storage medium (non-transitory tangible computer-readable storage medium or non-transitory tangible storage medium) that stores the program for implementing the above-described control method may be changed as appropriate. For example, the storage medium is not limited to the configuration provided on the circuit board, and may be provided in the form of a memory card or the like. The storage medium may be inserted into a slot portion, and electrically connected to the control circuit of the autonomous driving ECU or the control circuit of the HCU. The storage medium may include an optical disk which forms a source of programs to be copied into the autonomous driving ECU or the HCU, or a hard disk drive therefor.

The control units and methods thereof which have been described in the present disclosure may be also implemented by a special purpose computer which includes a processor programmed to execute one or more functions implemented by computer programs. Alternatively, the control device and method described in the present disclosure may be implemented by a special purpose hardware logic circuit. Alternatively, the control device and the method described in the present disclosure may be implemented by one or more special purpose computers configured by a combination of a processor executing a computer program and one or more hardware logic circuits. The computer program may also be stored, as a computer program product, in a computer-readable non-transitory tangible storage medium as computer-executable instructions.

What is claimed is:

1. A control device used in a subject vehicle capable of performing autonomous driving with no obligation for a driver to monitor periphery, the control device comprising a processor and a non-transitory storage medium configured to implement:
  a continuation determination unit that determines whether a permission state, in which a specific act other than driving is permitted to the driver, is continued or not when approach of an emergency vehicle to the subject vehicle is detected by a periphery monitoring sensor during an autonomous cruising period in which the autonomous driving is being performed; and
  a provision restriction unit that restricts display of a content provided to the driver by a display device when the continuation determination unit determines that the permission state of the specific act is not continued;
  wherein:
  when the approach of the emergency vehicle to the subject vehicle is detected, the continuation determination unit further determines whether the autonomous driving is continued or not;
  when the continuation determination unit determines that the autonomous driving is not continued, the provision restriction unit restricts the display of the content at a higher restriction level compared with a case where the continuation determination unit determines that the autonomous driving is continued;

at least one of (i) a determination in which whether the autonomous driving is continued or (ii) a determination in which whether the permission state of the specific act is continued is performed based on a relative position of an emergency vehicle lane in which the emergency vehicle travels;

when the subject vehicle travels in an adjacent lane adjacent to the emergency vehicle lane, continuation of the specific act is restricted and continuation of the autonomous driving is permitted.

2. The control device according to claim 1, wherein, when the periphery monitoring sensor detects that the emergency vehicle traveling in an opposite lane approaches from a front of the subject vehicle, the provision restriction unit provides a notification of the approach of the emergency vehicle.

3. The control device according to claim 1, wherein, when the continuation of the autonomous driving is permitted, a traveling speed of the subject vehicle set for the autonomous driving is changed to be lower than a previous speed at which the subject vehicle traveled before the emergency vehicle approaches the subject vehicle.

4. The control device according to claim 1, wherein, when the subject vehicle travels in a separate lane separated from the emergency vehicle lane, continuation of the specific act is permitted and the driver is notified of presence of the emergency vehicle detected by the periphery monitoring sensor.

5. The control device according to claim 1, wherein, when the subject vehicle travels in the emergency vehicle lane detected by the periphery monitoring sensor, continuation of the specific act is restricted and continuation of the autonomous driving is restricted.

6. The control device according to claim 1, wherein, when the subject vehicle travels in a lane different from the emergency vehicle lane detected by the periphery monitoring sensor and no vehicle exists around the subject vehicle, a permission state of sleep by the driver detected by a driver monitor is continued.

7. The control device according to claim 6, wherein, among all lanes included in the road, when a subject vehicle lane, in which the subject vehicle travels, is congested, as detected by the periphery monitoring sensor, and a non-congested lane, in which the emergency vehicle detected by the periphery monitoring sensor, can travel, is present on the road, continuation of the specific act is restricted and continuation of the autonomous driving is permitted.

8. A control device used in a subject vehicle capable of performing autonomous driving with no obligation for a driver to monitor periphery, the control device comprising a processor and a non-transitory storage medium configured to implement:

a continuation determination unit that determines whether a permission state, in which a specific act other than driving is permitted to the driver, is continued or not when approach of an emergency vehicle to the subject vehicle is detected by a periphery monitoring sensor during an autonomous cruising period in which the autonomous driving is being performed; and a provision restriction unit that restricts display of a content by a display device provided to the driver when the continuation determination unit determines that the permission state of the specific act is not continued;

wherein:

when the approach of the emergency vehicle to the subject vehicle is detected by the periphery monitoring sensor, the continuation determination unit further determines whether the autonomous driving is continued or not;

when the continuation determination unit determines that the autonomous driving is not continued, the provision restriction unit restricts the display of the content by the display device at a higher restriction level compared with a case where the continuation determination unit determines that the autonomous driving is continued;

at least one of (i) a determination in which whether the autonomous driving is continued or (ii) a determination in which whether the permission state of the specific act is continued is performed based on a condition of a road on which the subject vehicle travels; and among all lanes included in the road, when a subject vehicle lane, in which the subject vehicle travels, is congested and a non-congested lane, in which the emergency vehicle can travel, is present on the road, continuation of the specific act is restricted and continuation of the autonomous driving is permitted.

9. The control device according to claim 8, wherein, in a case where the provision restriction unit restricts the display of the content by the display device, the provision restriction unit continues a restricted state of the content until at least one cancellation condition is satisfied.

10. The control device according to claim 9, wherein the at least one cancellation condition is satisfied in response to a predetermined time being elapsed since the periphery monitoring sensor detects that the emergency vehicle has overtaken the subject vehicle, and the provision restriction unit continues the restricted state of the content by the display device until the predetermined time elapses.

11. The control device according to claim 10, wherein the at least one cancellation condition is satisfied in response to the periphery monitoring sensor detecting that the emergency vehicle that overtook the subject vehicle is separated from the subject vehicle by a predetermined distance or more, and the provision restriction unit continues the restricted state of the content by the display device until the emergency vehicle is separated from the subject vehicle by the predetermined distance or more.

12. The control device according to claim 10, wherein the at least one cancellation condition is satisfied in response to the periphery monitoring sensor detecting that the emergency vehicle has overtaken the subject vehicle and is separated from the subject vehicle by a predetermined distance or more, and the provision restriction unit continues the restricted state of the content by the display device until the emergency vehicle is separated from the subject vehicle by the predetermined distance or more.

13. The control device according to claim 9, wherein the at least one cancellation condition is satisfied in response to a behavior of another vehicle traveling around the subject vehicle becoming stable, and the provision restriction unit continues the restricted state of the content by the display device until the behavior of the another vehicle becomes stable.

14. The control device according to claim 10, wherein the at least one cancellation condition is satisfied in response to the periphery monitoring sensor detecting that the subject vehicle has overtaken the emergency vehicle again after having previously detected that the emergency vehicle overtook the subject vehicle, and the provision restriction unit continues the restricted state on the display of the content by the display device until the subject vehicle overtakes the emergency vehicle again.

15. The control device according to claim 14, wherein:
the provision restriction unit executes the notification to urge the driver in the sleep state to wake up at a timing earlier than a notification to notify the driver in an awake state of the approach of the emergency vehicle.

16. The control device according to claim 14, wherein, when the subject vehicle travels in a lane different from the emergency vehicle lane detected by the periphery monitoring sensor and no vehicle exists around the subject vehicle, a permission state of sleep detected by the driver monitor is continued.

17. The control device according to claim 8, wherein the at least one of (i) the determination in which whether the autonomous driving is continued or (ii) the determination in which whether the permission state of the specific act is continued is performed additionally based on a relative position of an emergency vehicle lane in which the emergency vehicle, detected by the periphery monitoring sensor, travels.

18. The control device according to claim 9, wherein, when the subject vehicle travels in an adjacent lane adjacent to the emergency vehicle lane, continuation of the autonomous driving is restricted and the driver is notified of presence of the emergency vehicle detected by the periphery monitoring sensor.

19. The control device according to claim 8, wherein, when all lanes included in the road are congested, as detected by the periphery monitoring sensor, continuation of the specific act is permitted and the driver is notified of presence of the emergency vehicle detected by the periphery monitoring sensor.

20. The control device according to claim 8, wherein, when the periphery monitoring sensor detects that the emergency vehicle traveling in an opposite lane is approaching from a front of the subject vehicle, the provision restriction unit provides a notification of the approach of the emergency vehicle.

21. The control device according to claim 8, wherein, when the subject vehicle travels in a separate lane separated from the emergency vehicle lane, continuation of the specific act is permitted and the driver is notified of presence of the emergency vehicle detected by the periphery monitoring sensor with at least one of an audio device or the display device.

22. The control device according to claim 8, wherein, when the subject vehicle travels in the emergency vehicle lane, detected by the periphery monitoring sensor, continuation of the specific act is restricted and continuation of the autonomous driving is restricted.

23. The control device according to claim 8, wherein, when the subject vehicle travels in a lane different from the emergency vehicle lane, detected by the periphery monitoring sensor, and no vehicle exists around the subject vehicle, a permission state of sleep detected by the driver monitor is continued.

24. A control device used in a subject vehicle capable of performing autonomous driving with no obligation for a driver to monitor periphery, the control device comprising a processor and non-transitory storage medium configured to implement:

an approach determination unit that determines whether an emergency vehicle is approaching the subject vehicle, based on data from a periphery monitoring sensor, during an autonomous cruising period in which the autonomous driving is being performed; and a continuation determination unit that determines whether to continue the autonomous driving and whether to continue a permission state in which a specific act other than driving is permitted to the driver, when the approach determination unit determines that the emergency vehicle is approaching the subject vehicle;

wherein:

at least one of (i) a determination in which whether the autonomous driving is continued or (ii) a determination in which whether the permission state of the specific act is continued is performed based on a condition of a road on which the subject vehicle travels; and among all lanes included in the road, when a subject vehicle lane, in which the subject vehicle travels, is congested and a non-congested lane, in which the emergency vehicle can travel, is present on the road, continuation of the specific act is restricted and continuation of the autonomous driving is permitted.

25. The control device according to claim 24, wherein at least one of (i) a determination in which whether the autonomous driving is continued or (ii) a determination in which whether the permission state of the specific act is continued is performed based on a relative position of an emergency vehicle lane in which the emergency vehicle detected by the periphery monitoring system travels.

26. The control device according to claim 24, wherein, when the subject vehicle travels in an adjacent lane adjacent to the emergency vehicle lane, continuation of the autonomous driving is restricted and the driver is notified of presence of the emergency vehicle detected by the periphery monitoring system by at least one of an audio device or a display device.

27. The control device according to claim 24, wherein, when the subject vehicle travels in a separate lane separated from the emergency vehicle lane, continuation of the specific act is permitted and the driver is notified of presence of the emergency vehicle detected by the periphery monitoring system by at least one of an audio device or a display device.

28. The control device according to claim 24, wherein, when the subject vehicle travels in the emergency vehicle lane detected by the periphery monitoring system, continuation of the specific act is restricted and continuation of the autonomous driving is restricted.

29. The control device according to claim 24, wherein, a permission state of sleep is detected by the driver monitor, and when the subject vehicle travels in a lane different from the emergency vehicle lane detected by the periphery monitoring system and no vehicle exists around the subject vehicle, the permission state of sleep detected by the driver monitor is continued.

30. The control device according to claim 24, wherein, when all lanes included in the road are congested, continuation of the specific act is permitted and the driver is notified of presence of the emergency vehicle detected by the periphery monitoring system by at least one of an audio device and a display device.

31. A control device used in a subject vehicle capable of performing autonomous driving with no obligation for a driver to monitor periphery, the control device comprising a processor and non-transitory storage medium configured to implement:

an approach determination unit that determines whether an emergency vehicle is approaching the subject vehicle, based on data from a periphery monitoring sensor, during an autonomous cruising period in which the autonomous driving is being performed; and a continuation determination unit that determines whether to continue the autonomous driving and whether to continue a permission state in which a specific act other than driving is permitted to the driver, when the approach determination unit determines that the emergency vehicle is approaching the subject vehicle;

wherein:

at least one of (i) a determination in which whether the autonomous driving is continued or (ii) a determination in which whether the permission state of the specific act is continued is performed additionally based on a relative position of an emergency vehicle lane in which the emergency vehicle travels; and when the subject vehicle travels in an adjacent lane adjacent to the emergency vehicle lane, continuation of the specific act is restricted and continuation of the autonomous driving is permitted.

32. The control device according to claim 31, wherein, when the continuation of the autonomous driving is permitted, a traveling speed of the subject vehicle set for the autonomous driving is changed to be lower than a previous speed at which the subject vehicle traveled before the emergency vehicle detected by the periphery monitoring sensor approaches the subject vehicle.

33. The control device according to claim 31, wherein, when the subject vehicle travels in a separate lane separated from the emergency vehicle lane, continuation of the specific act is permitted and the driver is notified of presence of the emergency vehicle detected by the periphery monitoring sensor.

34. The control device according to claim 31, wherein, when the subject vehicle travels in the emergency vehicle lane detected by the periphery monitoring sensor, continuation of the specific act is restricted and continuation of the autonomous driving is restricted.

35. The control device according to claim 31, wherein, a permission state of sleep is detected by the driver monitor, and when the subject vehicle travels in a lane different from the emergency vehicle lane detected by the periphery monitoring sensor and no vehicle exists around the subject vehicle, the permission state of sleep detected by the driver monitor is continued.

36. The control device according to claim 31, wherein at least one of (i) a determination in which whether the autonomous driving is continued or (ii) a determination in which whether the permission state of the specific act is continued is performed based on a condition of a road, detected by the periphery monitoring system, on which the subject vehicle travels.

37. The control device according to claim 36, wherein, among all lanes included in the road, when a subject vehicle lane, in which the subject vehicle travels, is congested, as detected by the periphery monitoring system, and a non-congested lane, in which the emergency vehicle detected by the periphery monitoring system can travel, is present on the road, continuation of the specific act is restricted and continuation of the autonomous driving is permitted.

38. A control program product stored in a computer-readable non-transitory storage medium, the control program product comprising instructions to be executed by a processing unit of a subject vehicle, which is capable of performing autonomous driving with no obligation for a driver to monitor periphery, the instructions comprising:

when approach of an emergency vehicle to the subject vehicle is detected by a periphery monitoring sensor during an autonomous cruising period in which the autonomous driving is performed, determining whether a permission state, in which a specific act other than driving is permitted to the driver, is continued;

when determining that the permission state of the specific act is not continued, restricting display of a content provided to the driver by a display device;

when the approach of the emergency vehicle to the subject vehicle is detected by the periphery monitoring sensor, determining whether the autonomous driving is continued or not;

when it is determined that the autonomous driving is not continued, restricting the display of the content by the display device at a higher restriction level compared with a case where it is determined that the autonomous driving is continued;

determining at least one of (i) whether the autonomous driving is continued or (ii) whether the permission state of the specific act is continued based on a relative position of an emergency vehicle lane in which the emergency vehicle travels;

when the subject vehicle travels in an adjacent lane adjacent to the emergency vehicle lane, restricting continuation of the specific act and permitting continuation of the autonomous driving.

39. A control program product stored in a computer-readable non-transitory storage medium, the control program product comprising instructions to be executed by a processing unit of a subject vehicle, which is capable of performing autonomous driving with no obligation for a driver to monitor periphery, the instructions comprising:

determining whether an emergency vehicle is approaching the subject vehicle, based on data from a periphery monitoring sensor, during an autonomous cruising period in which the autonomous driving is being performed;

when determining that the emergency vehicle detected by the periphery monitoring sensor is approaching the subject vehicle, further determining whether to continue the autonomous driving and whether to continue a permission state in which a specific act other than driving is permitted to the driver;

determining whether to continue the autonomous driving and whether to continue the permission state of the specific act, which is other than the driving, based on a relative position of an emergency vehicle lane in which the emergency vehicle travels.

40. A control device used in a subject vehicle capable of performing autonomous driving with no obligation for a driver to monitor periphery, the control device comprising a processor and non-transitory storage medium configured to implement:

an approach determination unit that determines whether an emergency vehicle is approaching the subject vehicle, based on data from a periphery monitoring sensor, during an autonomous cruising period in which the autonomous driving is being performed; and a continuation determination unit that determines whether to continue the autonomous driving and whether to continue a permission state in which a specific act other than driving is permitted to the driver, when the approach determination unit determines that the emergency vehicle detected by the periphery monitoring sensor is approaching the subject vehicle;

wherein the continuation determination unit determines whether to continue the autonomous driving and whether to continue the permission state of the specific act, which is other than the driving, based on a relative position of an emergency vehicle lane in which the emergency vehicle detected by the periphery monitoring sensor travels.

41. The control device according to claim 40, wherein, when the subject vehicle travels in an adjacent lane adjacent to the emergency vehicle lane, detected by the periphery monitoring sensor, continuation of the autonomous driving is restricted and the driver is notified of presence of the emergency vehicle detected by the periphery monitoring sensor with at least one of an audio device or a display device.

42. A control program product stored in a computer-readable non-transitory storage medium, the control program product comprising instructions to be executed by a processing unit of a subject vehicle, which is capable of performing autonomous driving with no obligation for a driver to monitor periphery, the instructions comprising:
- determining whether an emergency vehicle is approaching the subject vehicle, based on data from a periphery monitoring sensor, during an autonomous cruising period in which the autonomous driving is being performed;
- when determining that the emergency vehicle detected by the periphery monitoring sensor is approaching the subject vehicle, further determining whether to continue the autonomous driving and whether to continue a permission state in which a specific act other than driving is permitted to the driver;
- determining at least one of (i) whether the autonomous driving is continued or (ii) whether the permission state of the specific act is continued is performed based on a relative position of an emergency vehicle lane in which the emergency vehicle detected by the periphery monitoring sensor travels; and
- when the subject vehicle travels in an adjacent lane adjacent to the emergency vehicle lane, restricting continuation of the specific act and permitting continuation of the autonomous driving.

43. A control program product stored in a computer-readable non-transitory storage medium, the control program product comprising instructions to be executed by a processing unit of a subject vehicle, which is capable of performing autonomous driving with no obligation for a driver to monitor periphery, the instructions comprising:
- determining whether an emergency vehicle is approaching the subject vehicle, based on data from a periphery monitoring system, during an autonomous cruising period in which the autonomous driving is being performed;
- when determining that the emergency vehicle detected by the periphery monitoring system is approaching the subject vehicle, further determining whether to continue the autonomous driving and whether to continue a permission state in which a specific act other than driving is permitted to the driver;
- determining at least one of (i) whether the autonomous driving is continued or (ii) whether the permission state of the specific act is continued is performed based on a condition of a road, detected by the periphery monitoring system, on which the subject vehicle travels;
- among all lanes included in the road, when a subject vehicle lane, in which the subject vehicle travels, is congested, as detected by the periphery monitoring system, and a non-congested lane, in which the emergency vehicle detected by the periphery monitoring system can travel, is present on the road, restricting continuation of the specific act and permitting continuation of the autonomous driving.

44. A control program product stored in a computer-readable non-transitory storage medium, the control program product comprising instructions to be executed by a processing unit of a subject vehicle, which is capable of performing autonomous driving with no obligation for a driver to monitor periphery, the instructions comprising:
- when approach of an emergency vehicle to the subject vehicle is detected by a periphery monitoring sensor during an autonomous cruising period in which the autonomous driving is performed, determining whether a permission state, in which a specific act other than driving is permitted to the driver, is continued;
- when determining that the permission state of the specific act is not continued, restricting display of a content provided to the driver by a display device;
- when the approach of the emergency vehicle to the subject vehicle is detected by the periphery monitoring sensor, determining whether the autonomous driving is continued or not;
- when it is determined that the autonomous driving is not continued, restricting the display of the content by the display device at a higher restriction level compared with a case where it is determined that the autonomous driving is continued;

wherein:
- at least one of (i) the determination of whether the autonomous driving is continued or (ii) the determination of whether the permission state of the specific act is continued is performed is based on a condition of a road, detected by the periphery monitoring sensor, on which the subject vehicle travels; and
- among all lanes included in the road, when a subject vehicle lane, in which the subject vehicle travels, is congested, as detected by the periphery monitoring sensor, and a non-congested lane, in which the emergency vehicle detected by the periphery monitoring sensor, can travel, is present on the road, continuation of the specific act is restricted and continuation of the autonomous driving is permitted.

* * * * *